US011776175B2

(12) United States Patent
Moroney

(10) Patent No.: US 11,776,175 B2
(45) Date of Patent: Oct. 3, 2023

(54) ADAPTIVE POINT GENERATION

(71) Applicant: Hewlett-Packard Development Company, L.P., Spring, TX (US)

(72) Inventor: Nathan Moroney, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 284 days.

(21) Appl. No.: 16/978,303

(22) PCT Filed: Apr. 26, 2018

(86) PCT No.: PCT/US2018/029541
§ 371 (c)(1),
(2) Date: Sep. 4, 2020

(87) PCT Pub. No.: WO2019/209300
PCT Pub. Date: Oct. 31, 2019

(65) Prior Publication Data
US 2021/0031457 A1    Feb. 4, 2021

(51) Int. Cl.
| G06T 17/20 | (2006.01) |
| G06V 20/64 | (2022.01) |
| G06T 11/20 | (2006.01) |
| B33Y 50/00 | (2015.01) |
| B29C 64/393 | (2017.01) |
| B23K 26/38 | (2014.01) |
| G06V 10/426 | (2022.01) |
| G06V 10/48 | (2022.01) |

(52) U.S. Cl.
CPC ............ *G06T 11/203* (2013.01); *B23K 26/38* (2013.01); *B29C 64/393* (2017.08); *B33Y 50/00* (2014.12); *G06T 17/20* (2013.01); *G06V 10/426* (2022.01); *G06V 10/48* (2022.01); *G06V 20/64* (2022.01)

(58) Field of Classification Search
None
See application file for complete search history.

(56) References Cited

U.S. PATENT DOCUMENTS

| 5,926,567 A * | 7/1999 | Collins ................... G09G 5/39 |
| | | 382/187 |
| 8,983,646 B1 * | 3/2015 | Hanna ..................... G06F 30/00 |
| | | 700/119 |

(Continued)

FOREIGN PATENT DOCUMENTS

WO    WO-2016173260    11/2016

OTHER PUBLICATIONS

Ekdemir, "Efficient Implementation of Polyline Simplification for Large Datasets and Usability Evaluation", Sep. 2011, (Year: 2011).*

*Primary Examiner* — Saptarshi Mazumder
(74) *Attorney, Agent, or Firm* — SHOOK, HARDY & BACON L.L.P.

(57) ABSTRACT

A computing system for adaptive point generation includes a storage to store a densely sampled polyline or surface, or mathematical function, and a processor to compute the area of a contour of the polyline or function with respect to itself, or compute the volume of the surface or function with respect to itself, adaptively resample the polyline, surface, or function, wherein the adaptive resampling is based on and inversely proportional to the computed area or volume, and connect adaptively resampled points as an adaptively sampled polyline or surface.

13 Claims, 21 Drawing Sheets

(56) References Cited

U.S. PATENT DOCUMENTS

| | | |
|---|---|---|
| 9,207,094 B2 | 12/2015 | Pirwani et al. |
| 9,492,240 B2 | 11/2016 | Itkowitz et al. |
| 9,819,674 B2 | 11/2017 | Haapanen et al. |
| 2010/0214294 A1* | 8/2010 | Li .......................... G06T 17/20 |
| | | 345/423 |
| 2011/0013842 A1 | 1/2011 | Wei |
| 2013/0076619 A1 | 3/2013 | Carr et al. |
| 2015/0079327 A1 | 3/2015 | Kautz et al. |
| 2015/0146971 A1 | 5/2015 | Robert et al. |
| 2017/0248937 A1 | 8/2017 | Guimbretiere et al. |
| 2018/0012392 A1* | 1/2018 | Kryachko ............. G06T 15/005 |

\* cited by examiner

```
<html>
<svg height="700" width="700">
<rect width="700" height="700" style="fill:rgb(200,200,240);stroke-width:1;stroke:rgb(0,0,0)" />
<path d="M158 162 L173 163 L222 163 L244 163 L266 163 L274 165 L275 173 L275 181 L275 190 L275 210 L275 260 L277 310 L286 318 L294 325 L302 332 L357 382 L411 432 L432 453 L447 468 L461 481 L469 489 L472 497 L477 505 L480 512 L488 520 L486 528 L479 534 L476 541 L476 549 L474 558 L469 566 L469 574 L476 580 L476 588 L469 592 L460 593 L452 594 L443 595 L420 597 L400 598 L391 599 L383 600 L375 593 L375 585 L373 576 L367 568 L360 561 L351 553 L342 548 L326 535 L317 535 L305 531 L299 524 L291 519 L283 518 L274 516 L262 516 L254 512 L252 506 L251 498 L251 490 L247 484 L242 477 L236 470 L218 447 L212 439 L205 432 L203 424 L206 417 L208 409 L202 403 L193 400 L187 393 L186 385 L182 376 L182 367 L177 360 L169 354 L166 349 L163 340 L158 333 L150 325 L143 318 L138 310 L137 301 L134 292 L135 284 L135 276 L131 267 L125 259 L117 251 L114 242 L114 233 L118 225 L122 216 L122 208 L124 199 L125 191 L123 182 L119 173 L120 164 L128 163 L136 163 L145 163 Z"
style="fill:rgb(240,200,200);stroke-width:3;stroke:rgb(220,40,40)" />
</svg>
</html>
```

ADAPTIVE POINT GENERATION

BACKGROUND

In the context of computer graphics two-dimensional (2-D) or three-dimensional (3-D) printing or other computer-aided fabrication applications, polylines and mathematical equations can be used to represent curves which in turn can form the basis of shapes, objects, and textures. For example, a two-dimensional shape can be represented by a closed polyline curve consisting of a set of coplanar points and straight line-segment connections between the points, two connections per point, such that a circuit can be completed over the whole shape by traversing all the connections from one point to the next. As another example, a three-dimensional shape can be represented by a mesh, e.g., a triangular mesh, which can incorporate polyline curves as edges of the shape. Curves, shapes, and three-dimensional objects can also be represented by mathematical equations that can define arbitrary placements of points along the boundaries defined by the equations.

BRIEF DESCRIPTION OF THE DRAWINGS

Throughout the drawings, identical reference numbers designate similar, but not necessarily identical, elements.

DETAILED DESCRIPTION

2-D and 3-D scanning technologies generally produce raster 2-D or 3-D representations consisting of pixels, voxels, height maps, or the like. By contrast, some 2-D and 3-D printing or fabrication technologies can require the computer-stored representations of the shapes and objects that are desired to be generated to be vector representations, e.g., sets of points, graphs, or meshes that define edge contours and/or surface planes. Inefficient vector representations (e.g., lines or meshes) generated from raster inputs or from mathematical functions can be sample-point dense and thus consume more memory and processing resources than desirable.

The adaptive point sampling systems and methods described herein make use of the discoveries that the amount of change in shape of a curve can be computed by measurements of the area of the curve with respect to itself, and that the provided computation of change is finite, signed and is near zero for flat regions of the examined curve. U.S. Pat. No. 9,846,949 to the present inventor, incorporated herein by reference, uses this computation of an area of a curve with respect to itself to perform shape classification. The present systems and methods use this computation of an area of a curve with respect to itself to implement adaptive point sampling.

As described in detail herein with reference to the examples that follow, adaptive point sampling transforms input data or functions from higher density raster or vector data or curve- or surface-representing equations to a set of points of varying density, wherein the density of a set of adaptively sampled points on a curve is greatest at portions of the curve where the area of the curve with respect to itself is greatest. Consequently, the mean density of points following adaptive sampling can be substantially lower than the original mean point density, which may be substantially uniform. As used herein, the terms "high density" or "higher density" refer to curve or surface point densities that, at least on spatial average, are greater than subsequently adaptively sampled point densities, which can thus be referred to as "low density" or "lower density," relatively speaking. Similarly, references herein to a "dense sampling" of a curve or surface, or a curve or surface that is "densely sampled," refer to higher density sampling than the relatively lower density sampling of a subsequently adaptively sampled curve or surface.

Figure 1:
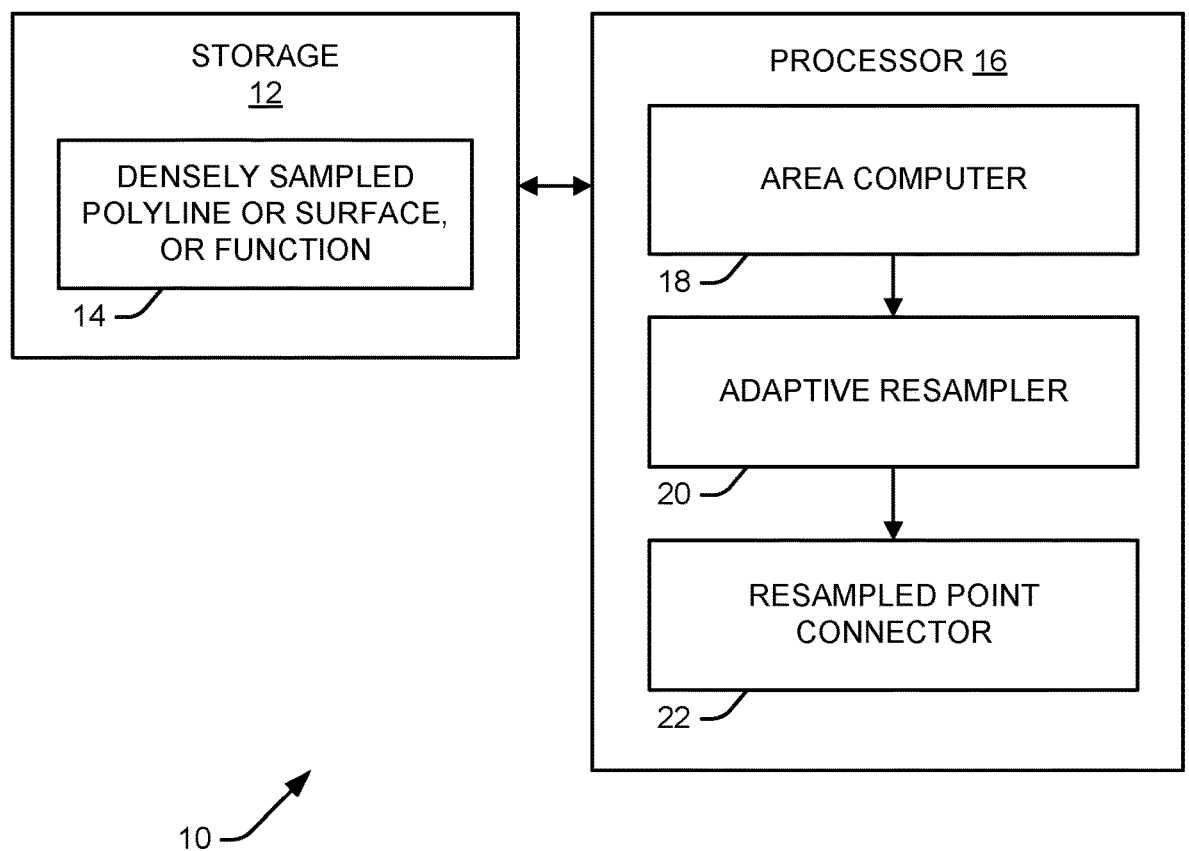
FIG. 1 is a system block diagram depicting an example adaptive point generation system.

FIG. 1 illustrates an example system 10 for adaptive point generation. System 10 can include storage 12 to store densely sampled polyline or surface, or function, 14 and processor 16 configured with area computer 18 to compute a function representing the area of a contour of densely sampled polyline or surface, or function, 14 with respect to itself, adaptive resampler 20 to adaptively resample densely sampled polyline or surface, or function, 14, and resampled point connector 22 to connect adaptively resampled points as a less densely sampled polyline or surface. Stored densely sampled polylines or surfaces 14 can be the result of a 3-D scanning device, a 2-D imaging device such as a camera or 2-D scanner, a single slice of a 3-D object to be printed, or other pixel or voxel sampling. The adaptive resampling of adaptive resampler 20 can be based on and inversely proportional to the computed area of the contour of densely sampled polyline or surface, or function, 14 with respect to itself, as computed by area computer 18.

The adaptive point generation system 10 can, for example, construct a path through polyline, surface, or function 14. Area computer 18 can compute the area of this path with respect to itself by, for example, computing the area of a triangle formed from a given point to vertices plus or minus some constant from this point, for a set of such triangles corresponding to a set of points along the path. Other area measures could also be used, such as circular arc or other geometric primitive. Adaptive resampler 20 can then use the computed sequence of areas to sample the path inversely proportionally to the path's area with respect to itself, such that flat portions of the path, which have small computed areas, have larger steps between samples, and such that portions of the path having concavities and convexities, which have larger computed areas, have smaller steps between samples.

As one example, adaptive resampler 20 can use a logarithmic weighting for a non-linear inverse weight, but another function such as a power function or other non-linear monotonic function could be used. Not shown in FIG. 1, but discussed in greater detail with respect to FIG. 2, interior points can also be sampled on the surface or volume of the interior using an even sparser 2-D Poisson disk sampling or 3-D Poisson sphere sampling. These interior sampled points can then form a compact yet representative sampling of polyline, surface, or function 14.

Figure 2:
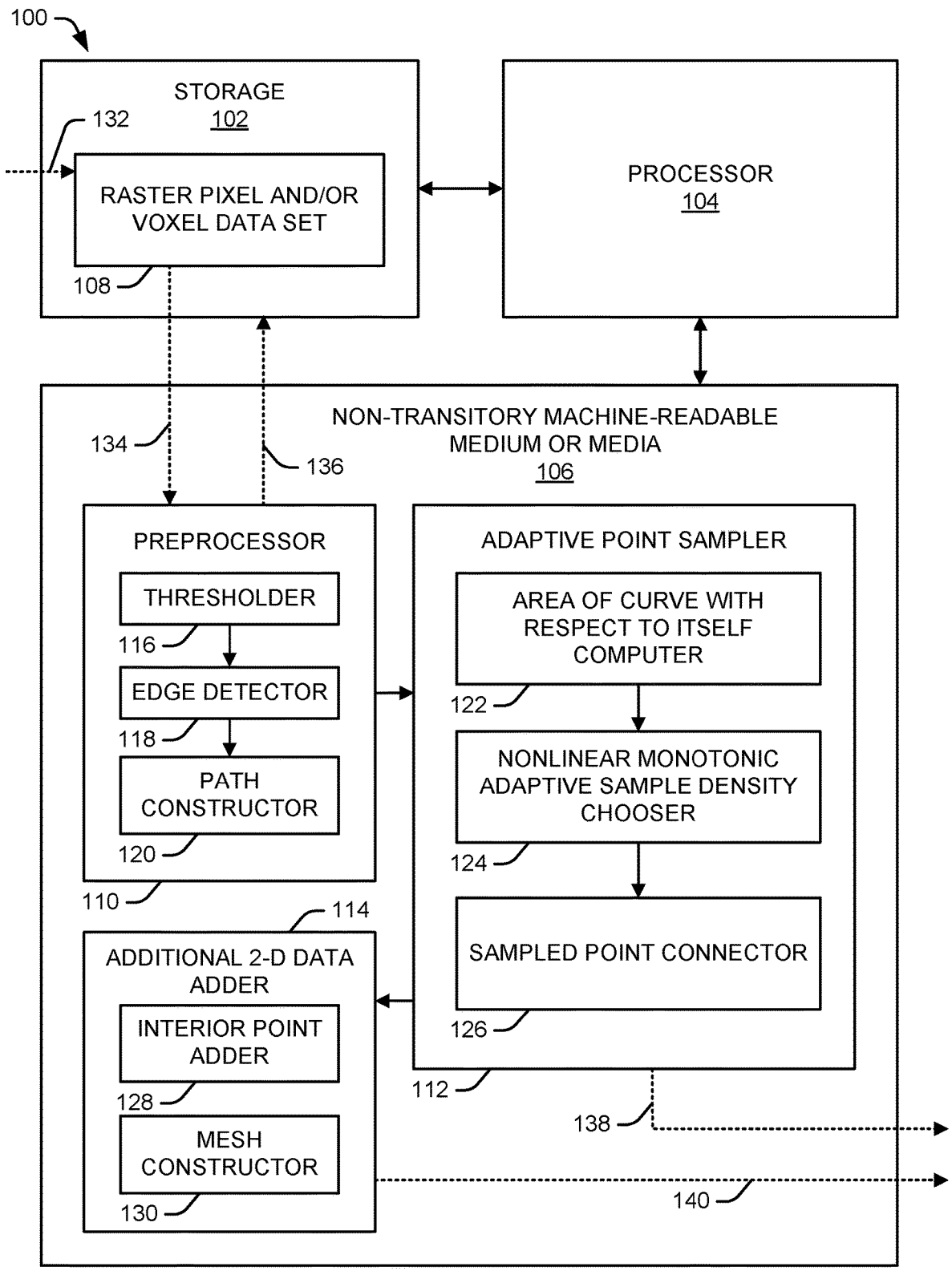
FIG. 2 is a system block diagram depicting an example system for adaptive point sampling.

FIG. 2 illustrates another example system 100 for adaptive point sampling, which can correspond to system 10 illustrated in FIG. 1. The system can be implemented using a general-purpose digital electronic computer or a special-purpose computer such as a graphics processor or a specially designed application-specific integrated circuit (ASIC). System 100 can include storage 102 (e.g., a hard disk or non-volatile solid state memory), processor 104, and one or more non-transitory machine-readable media 106 (e.g., a RAM) capable of storing and providing to processor 104 for execution instructions. Storage 102 can hold raster pixel and/or voxel data set 108 describing two-dimensional (2-D) shapes and/or three-dimensional objects. In some examples, storage 102 can hold mathematical functions describing 2-D and/or 3-D shapes. In some examples, storage 102 can hold instructions to provide to machine-readable media 106. Instructions in machine-readable media 106 can provide preprocessor 110, adaptive point sampler 112, and additional 2-D data adder 114.

Preprocessor 110 can include a thresholder capable of separating one or more monolithic shapes or objects from a non-shape/non-object background, which may contain noise. Edge detector 118 can find shape or object edges by, for example, applying a difference operator to compute a measure of edge strength. Edge detector 118 may also include an edge thinner, such as a skeletonizer, to narrow detected edges to a single data quantum (e.g., one pixel or one voxel width). Path constructor 120 can convert the resultant edges to sets of edge points, e.g., by placing one edge point at each pixel or voxel on the edge, and then can construct one or more paths by connecting neighboring edge points with line segments and ordering these segments into a path that progresses sequentially from one edge point to the next. As one example, a resultant edge path can be a closed polyline path describing a 2-D shape. Preprocessor 110 can thus be characterized as a raster-to-vector converter that can create, for example, one or more polyline curves (or surfaces) of relatively high sampling density. The high sampling density (e.g., one edge point per edge pixel or voxel) means that the curves (or surfaces) generated by preprocessor 110 are represented inefficiently with a large amount of redundancy and with a greater than necessary volume of data.

Adaptive point sampler 112 can receive the one or more resultant edges from preprocessor 110. Each edge can be successively passed off to area computer 122, sample density chooser 124, and sampled point connector 126. For a given edge having some curvature, area computer 122 can compute the area of the edge's curve with respect to itself, which area is a function of the particular point along the edge. In 3-D examples, area computer 122 might be referred to as a volume computer as it can compute the volume of a 3-D surface with respect to itself using an analogous computation process extended to the 3-D domain.

As one example, the area computation can be done by iterating over each edge point and constructing a triangle between (i.e., defined by) the current edge point, a prior edge point, and a later edge point along the curve, and then computing the area of the constructed triangle. The prior and later edge points can be, but need not be, the immediate prior and succeeding edge points in the densely sampled polyline edge. For example, the prior and later edge points can each be a number away that can depend on a user- or adaptively selected parameter. Such a parameter can be based, for example, on the total path length (i.e., number of densely sampled edge points) of the edge undergoing adaptive point sampling by adaptive point sampler 112. The prior and later edge points can both be a predetermined distance apart from the current point along the curve.

For example, the prior and later edge points can be, respectively, plus and minus five percent of the path length away from the current edge point in the iteration over the path. Thus, for example, in a path of one thousand edge points, the triangles constructed by area computer 122 for area computation purposes can be made of prior and later edge points that are 50 densely sampled edge points away from the currently iterated point on the edge path. In other examples, the prior and later edge points both be at a predetermined distance that is between two and ten percent of the path length away from the current edge point. For example, they can respectively be plus and minus two percent, three percent, seven percent, or ten percent of the path length away from the current edge point. Area computation by triangles is but one example of how the area of a curve with respect to itself can be computed. Other area measures could also be used, such as circular arc or other geometric primitive. In the case of 3-D surfaces, area computer 122 can instead act as a volume computer to compute the volume of a surface with respect to itself.

The area function or some portion thereof (or, in the case of 3-D surfaces, volume function) having been computed by area computer 122, sample density chooser 124 can resample an edge being analyzed inversely proportionally to the computed area of the edge's curve with respect to itself, or, in 3-D cases, can resample a surface being analyzed inversely proportionally to the computed volume of the surface with respect to itself. This can be done by applying a function that samples more finely as the computed area gets bigger and less finely as the computed area gets smaller along the edge path. As one example, sample density chooser can apply a nonlinear monotonic function, such as a logarithmic function, to adaptively determine points to be sampled along the edge under consideration by adaptive point sampler 112.

An example of one such sampling equation uses the natural logarithm to provide inverse logarithmic weighting, and is of the form $D=C-B \ln A$, where D is the adaptive sample density, i.e., the step size, at a given point along the edge path, A is the computed area of the edge path with respect to itself at the given point, ln is the natural logarithm, non-flat sampling constant B is a parameter that in part determines a minimum sampling step size, and flat sampling constant C is a parameter than determines a maximum sampling step size. The values of constants B and C can be pre-set or user-set parameters or can be adaptively chosen. As examples, suitable values for B can be between about 15 and 23, e.g., 18; suitable values for C can be between about 50 and 150, e.g., 100. The sampling equation could use other nonlinear monotonic functions rather than the natural logarithm. In some examples, the sampling equation could use a power function or an exponential function. Whatever its form, the sampling equation is what determines whether sampling density or sparsity.

The adaptive sampling performed by sample density chooser 124 can thus be likened to dropping breadcrumbs to mark a walking path while traversing the path. While proceeding straight along the walking path, fewer breadcrumbs are dropped, as compared to traversing angles or curves in the walking path, for which more breadcrumbs are dropped the sharper the angle or curve. Provided the input area A from area computer 122, the output D of the sampling equation in effect gives the step size to be taken before the dropping of the next breadcrumb (i.e., the next sample point). Sample density chooser 124 having resampled the edge provided to adaptive point sampler 112, sampled point connector 126 can connect the adaptively sampled edge points to form a new contour, for example using same or similar point connection techniques as used by path constructor 120.

Because it is not necessary that the entire curve (or surface) be traversed to compute its area (or volume) with respect to itself before adaptive sampling, area computer 122 and adaptive sample density chooser 124 can function substantially contemporaneously. That is, once each point along the curve or surface has had its corresponding area (or volume) with respect to itself computed by area computer 122, the sample density can be chosen for that point by adaptive sample density chooser 124 without waiting for the area (or volume) computation to be performed for subsequent points along the curve (or surface).

The output of adaptive point sampler 112 is thus an efficiently generated contour that has been adaptively sampled, e.g., downsampled. In some examples, this contour can be output as an SVG file or similar, stored to storage 102, and/or provided to some other system, such as a printing or fabrication system. In some examples, this contour can be handed off to additional 2-D data adder 114, which can include interior point adder 128 and mesh constructor 130. Interior point adder 128 can add additional points to the interior of the adaptively sampled contour. For example, these can be randomly placed points of appropriate density generated in accordance with Poisson disk sampling. Mesh constructor 130 can then perform construction of a mesh using, for example, a Voronoi diagram technique to partition the interior space of the adaptively sampled contour into regions. Such a mesh can be, for example, a triangular mesh, in a format such as an STL file. The mesh construction on the added interior points allow the shape described by the adaptively sampled contour to be 3-D printed or visualized in a 3-D viewer like MeshLab, which is an open source system for processing and editing 3-D triangular meshes.

The dotted lines in FIG. 2 illustrate effective data flow in system 100. Input 132 can be provided, for example, by a 2-D or 3-D scan process that generates the raster pixel and/or voxel data set 108, which is then provided 134 to preprocessor 110. Preprocessed data—i.e., raster-to-vector converted data—can be returned 136 to storage 102, which can then correspond to densely sampled polyline or surface 14 in FIG. 1. Output(s) of systems 10 or 100—e.g., an adaptively sampled contour 138 and/or mesh 140—can be provided to a 2-D or 3-D printing or fabrication system. Examples of 3-D printers can include stereolithography (SLA) printers, digital light processing (DLP) printers, fused deposition modeling (FDM) printers, selective laser sintering (SLS) printers, selective laser melting (SLM) printers, electronic beam melting (EBM) printers, laminated object manufacturing (LOM) printers, and jet fusion printers. Examples of such fabrication systems can include computer numerical control (CNC) routers, millers, laser cutters, engravers, etchers, and depositors. When input 132 is a scanner and output 138 or 140 is linked to a printer or other fabricator, system 100 can work as an object duplicator to manufacture copies of scanned 2-D or 3-D input objects.

FIGS. 3 through 20 further illustrate the adaptive point sampling of the present systems and methods, and thus the function of systems 10 and 100, by way of example involving an edited version of a climate map of the State of California. The example shape is representative of one that could be one layer of a dense voxel sampling, a single slice from a 3-D printing pipeline, or a high contrast 2-D image either scanned using a 2-D scanner or sourced as a bitmap or other 2-D raster image file. Furthermore, although the example is laid out as a 2-D example for simplicity of illustration, the systems and methods herein are extendable to adaptive resampling of 3-D surfaces, by computing the volume of a 3-D surface with respect to itself rather than by computing the area of a 2-D edge contour with respect to itself, as in the illustrated 2-D example outlined below.

Figure 3:
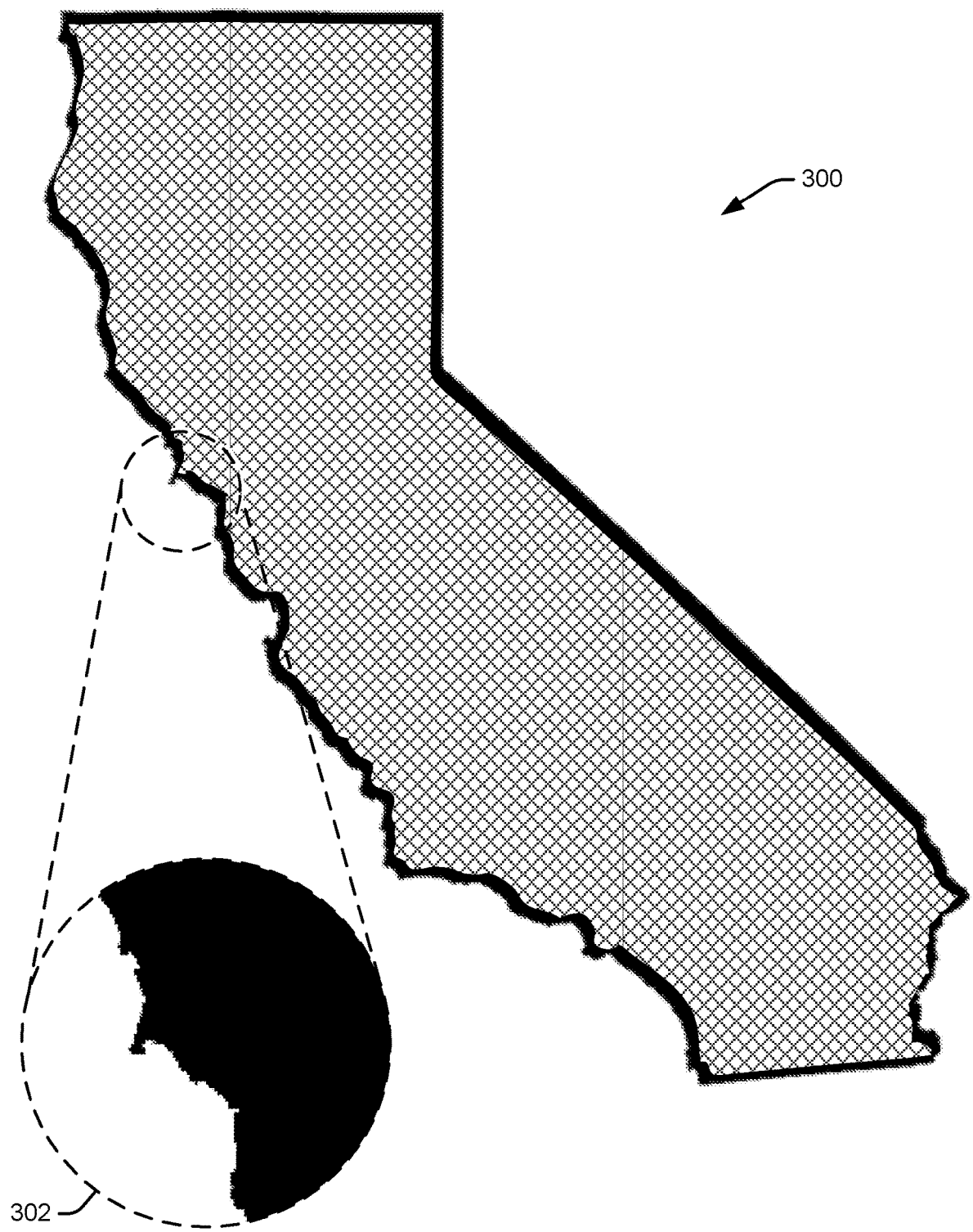
FIG. 3 shows a 2-D raster shape with a magnified portion illustrating the rasterization.

FIG. 3 shows input high-contrast 2-D raster image 300 of California. If not already high-contrast, it can be thresholded to result in a high-contrast (e.g., 1-bit, e.g., black and white) image, as by thresholder 116 of FIG. 2, as previously described. Raster image 300 is illustrated with cross-hatching solely to avoid a large are of solid black in FIG. 3; it will be understood that this cross-hatched area is intended to be solid black. Magnified view 302 shows raster character of the image, which in close-up can be seen to be pixelated. Additionally, where desired, as shown here, a fast median 2-D processing can be applied to provide a minor degree of smoothing. It will be appreciated that raster image 300 is represented by data with an undesirable amount of redundancy. For an arbitrary two-color-value (e.g., black and white) raster shape having an interior of one color and an exterior of another color, the area of interest, i.e., that which accounts for the majority of the entropy of the shape and thus the majority of the storage space needed to be allocated to store the shape in memory, is at the boundary of the shape.

Figure 4:
FIG. 4 shows a 2-D raster edge detected from the raster shape of FIG. 3.

Edge detection can be applied to raster image 300 of FIG. 3 to result in high contrast image smoothed edge pixels 400 of FIG. 4. All of the image processing up to this point is conducted in the pixel domain. All of the following steps are performed with respect to one or more geometric primitives, such as points, line segments, paths and triangles.

Figure 5:
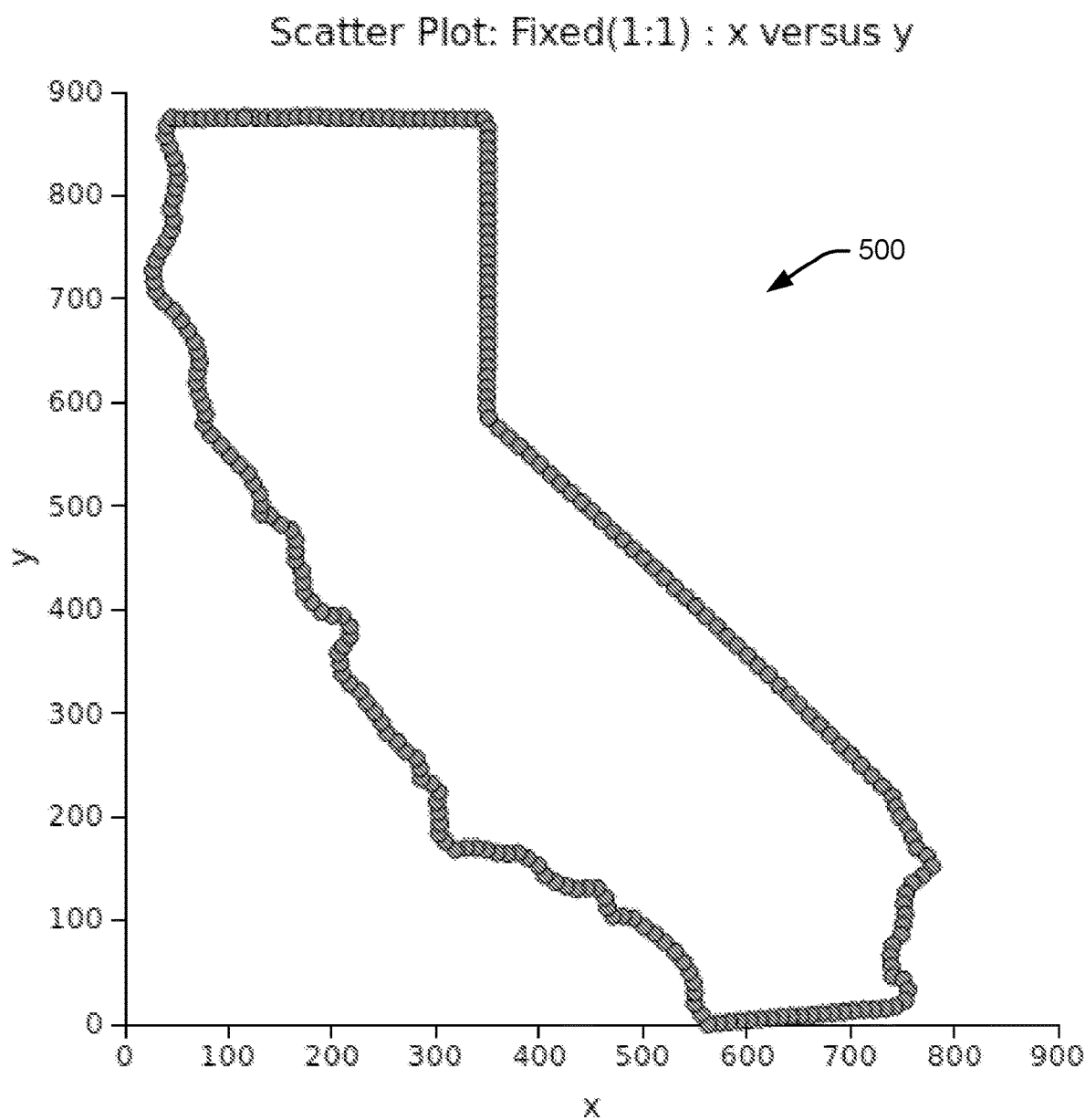
FIG. 5 is a scatter plot of points densely sampled from the raster edge of FIG. 4.
Figure 6:
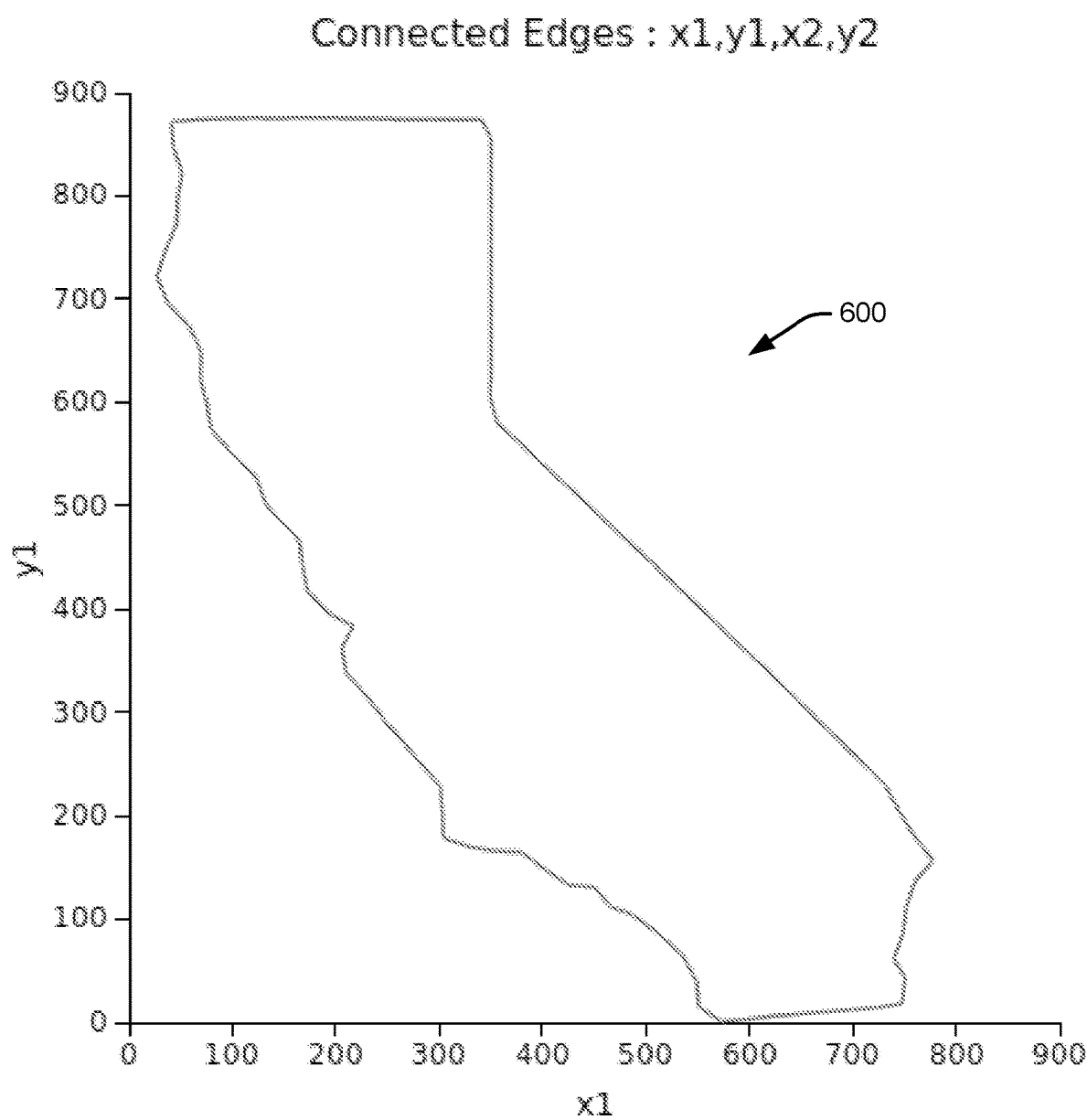
FIG. 6 is a plot of line segment edges connected between the points of FIG. 5.

FIG. 5 is a scatter plot 500 showing the selection of edge points along the edge 400 of FIG. 4, for a subset of points, specifically every 10 points, so that the individual points can be seen in FIG. 5. For this scatter plot 500, and all subsequent plots, the y-axis data has been "flipped" with respect to the image pixels since the pixel-coordinate origin of raster image 300 is at the upper left, whereas the conventional x-y plot origin is at the lower left, as indicated in FIG. 5. Further corresponding to the functioning of path constructor 120 of FIG. 2, edge line segments 600 can be extracted from the selected edge points, resulting in a vector or ordered list of points that consist of a starting point for each segment and an ending point for each segment, as shown in FIG. 6. A 25-pixel line segment length has been selected for illustration purposes to highlight the linear nature of the results of the point connection.

Figure 7:
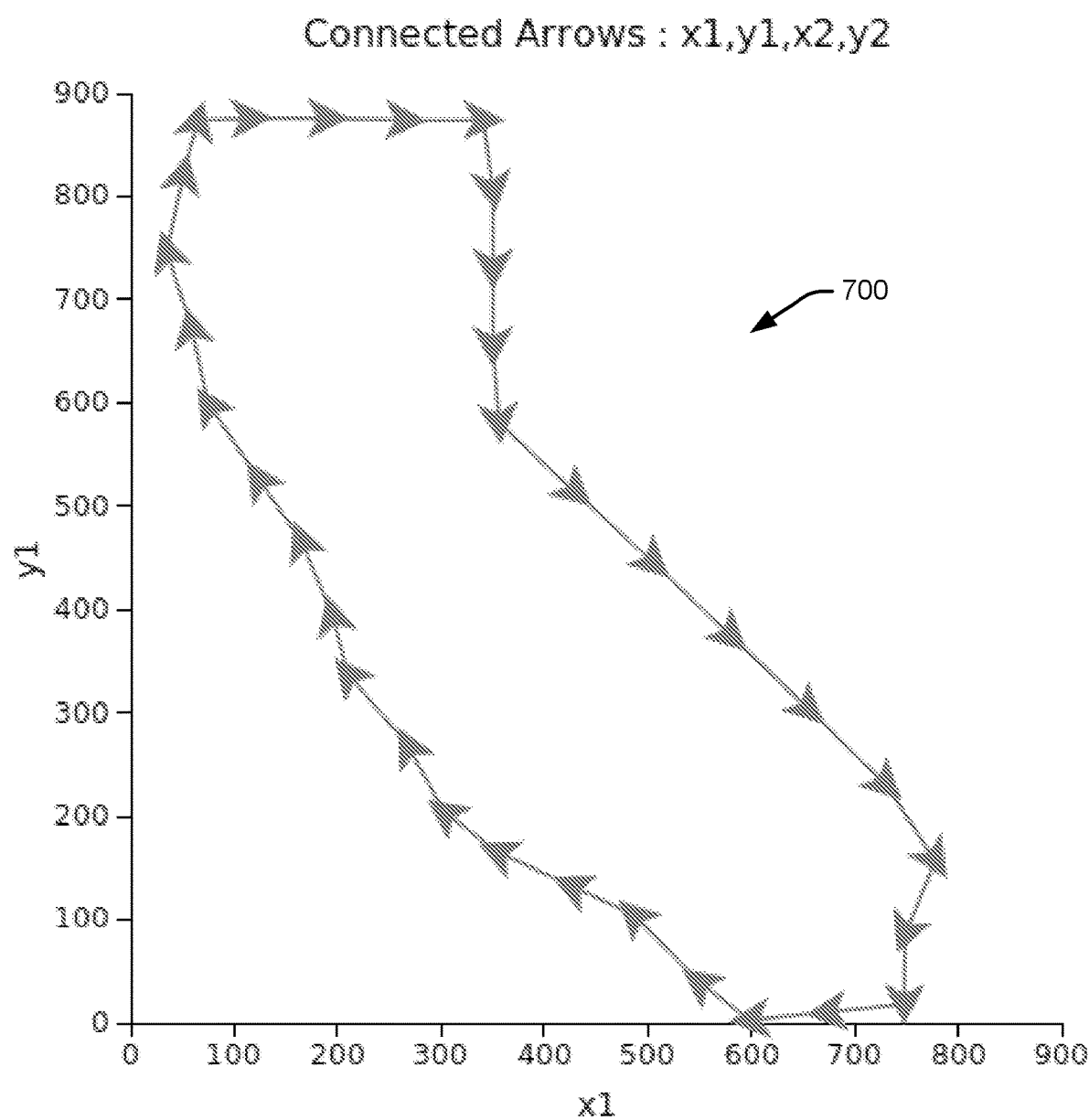
FIG. 7 is a plot of connected arrows showing a path constructed from the edges of FIG. 6.

FIG. 7 shows the results of the conversion of edge line segments 600 to a 2-D path 700. While the plot 600 of FIG. 6 consists of unordered line segments, the 2-D path 700 of FIG. 7 is an ordered set of line segments in which the ending point of one line segment is the starting point of the next line segment. To complete the path 700, the last line segment is connected to the first. This is visualized in FIG. 7 as a series of arrows of length 75 pixels in plot 700. These lengths of the arrows have been exaggerated for purposes of illustration; the segment lengths would ordinarily be the original distances between densely sampled points, e.g., one pixel apart. By definition, a well formed perimeter does not have any holes or discontinuities, which is the case here. Not shown, an edge graph can also be constructed from the line segments, which edge graph can be useful in other processing not described herein.

FIGS. 3 through 7 thus can correspond to the functioning of preprocessor 110 of FIG. 2. FIGS. 8 through 13 accordingly can correspond to the functioning of processor 16 of FIG. 1 or adaptive point sampler 112 of FIG. 2. The adaptive point sampling scheme permits a high-density image to be substantially faithfully reduced to a handful of vector points, e.g., on the order of 100 points, in a representation that captures corners and concavities and convexities alike. As a basis for the adaptive point sampling of FIGS. 8 through 13, the area of the curve is computed with respect to itself. A straight line does not have any area with respect to itself, but a curved contour does.

Figure 8:
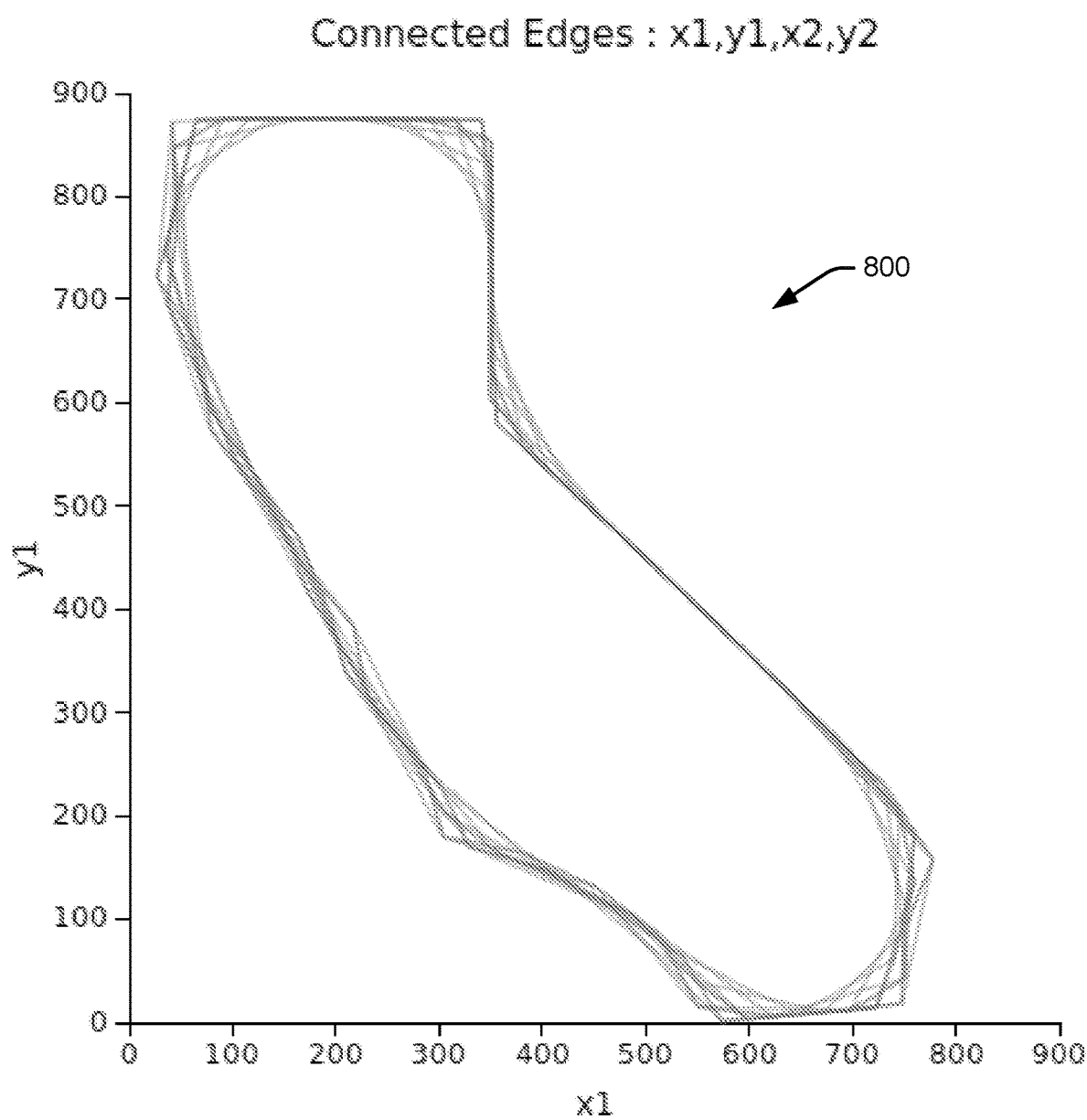
FIG. 8 illustrates computation of the area of the path of FIG. 7 with respect to itself by computing the area of a set of triangles formed from points as shown in FIG. 5.

FIG. 8 illustrates the computation of the area of the curve with respect to itself, as can be performed by area computer 18 in FIG. 1 or 122 in FIG. 2. This computation can be done by taking, for each point on the path, the area of a triangle that is formed by the given point and two other points plus or minus some step size from the given point. As discussed previously, this step size can be user-selected or adaptively selected, and can be a percentage of the total path length. For example, the step size can be two, three, five, seven, or ten percent of the path length away from the given point. The computed area is a function, the argument of which is the given point. The area computation is shown in plot 800 as a series of triangles progressing around the perimeter. To aid visibility, not all triangles are shown, and they are plotted as partially transparent.

Figure 9:
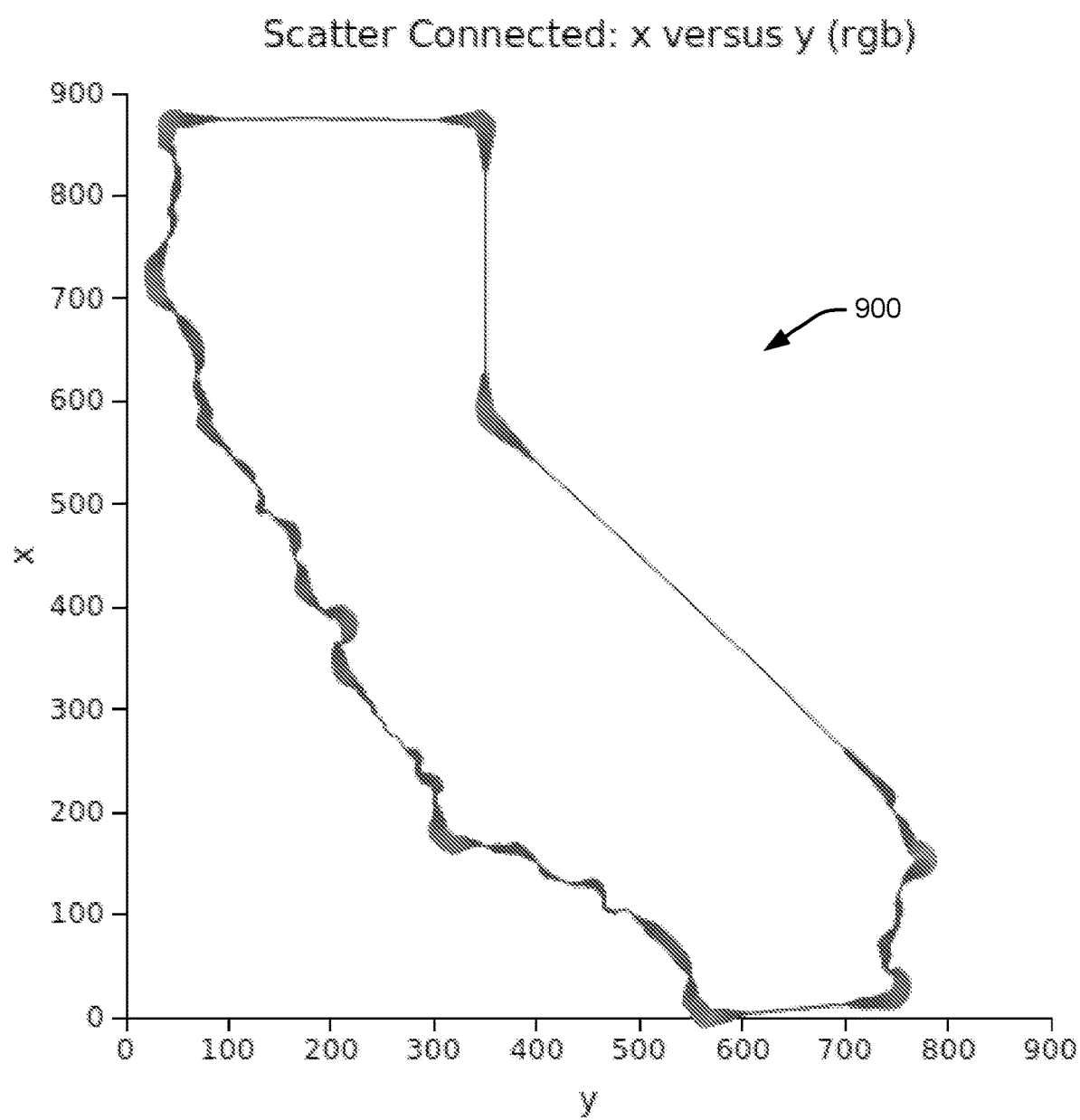
FIG. 9 illustrates the area function computed as shown in FIG. 8 as a plot of varying thickness corresponding to the computed area.

FIG. 9 is a visualization of the computed area using, in part, thickness as an indicator of computed area. The thickness of the plot 900 is least for regions of the curve of zero or near zero area of the curve with respect to itself, and thickest for regions of the curve having area of the curve with respect to itself near the maximum. The area computation returns a signed value, but for the purposes of illustration in FIG. 9, the absolute value of computed area is used. Thus, thin segments are shown for flat portions of the shape perimeter and thick segments are shown for concave or convex portions of the shape perimeter.

Figure 10:
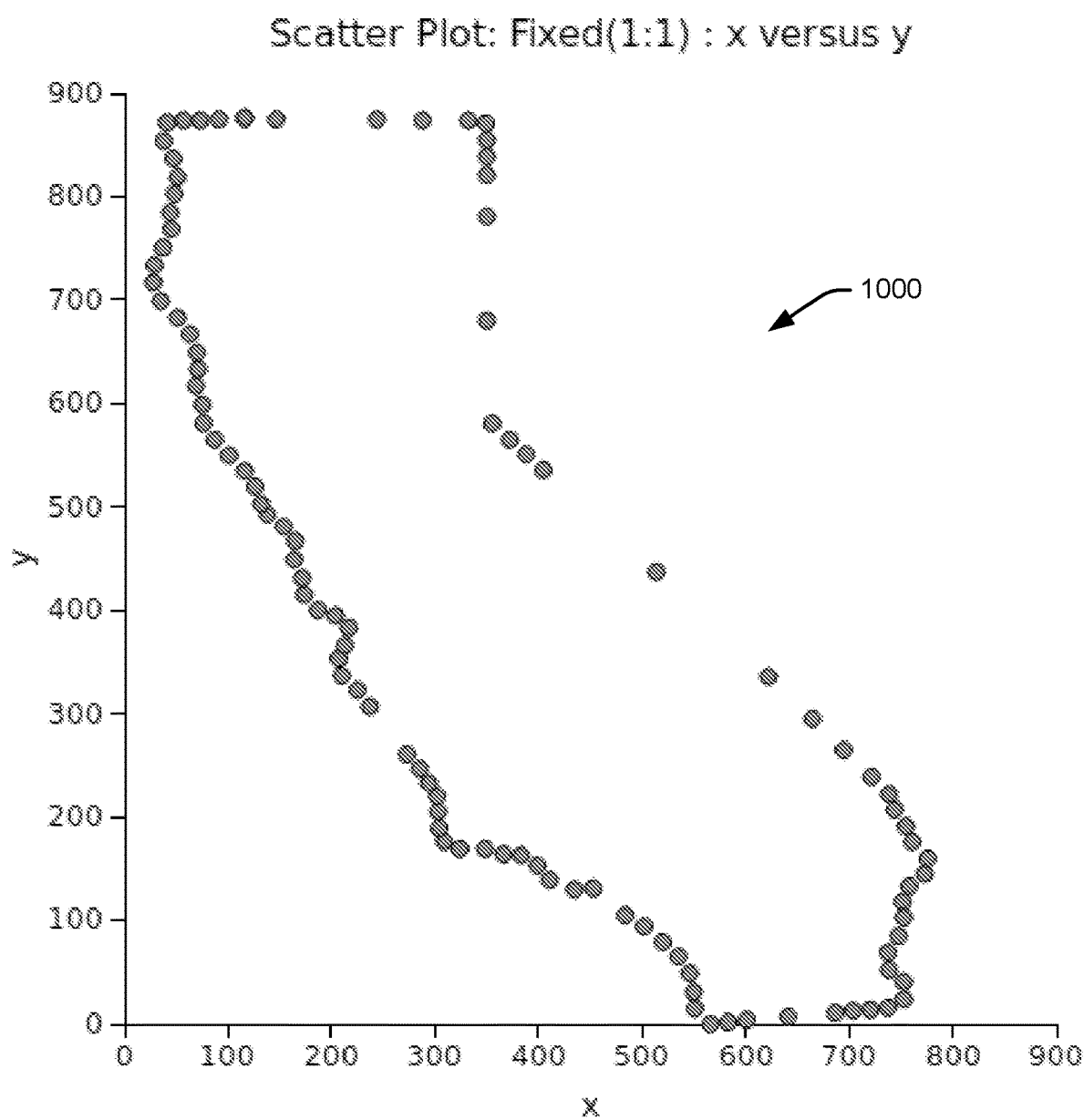
FIG. 10 is a scatter plot of points adaptively sampled with a sampling density based on the computed area as shown in FIG. 9.
Figure 11:
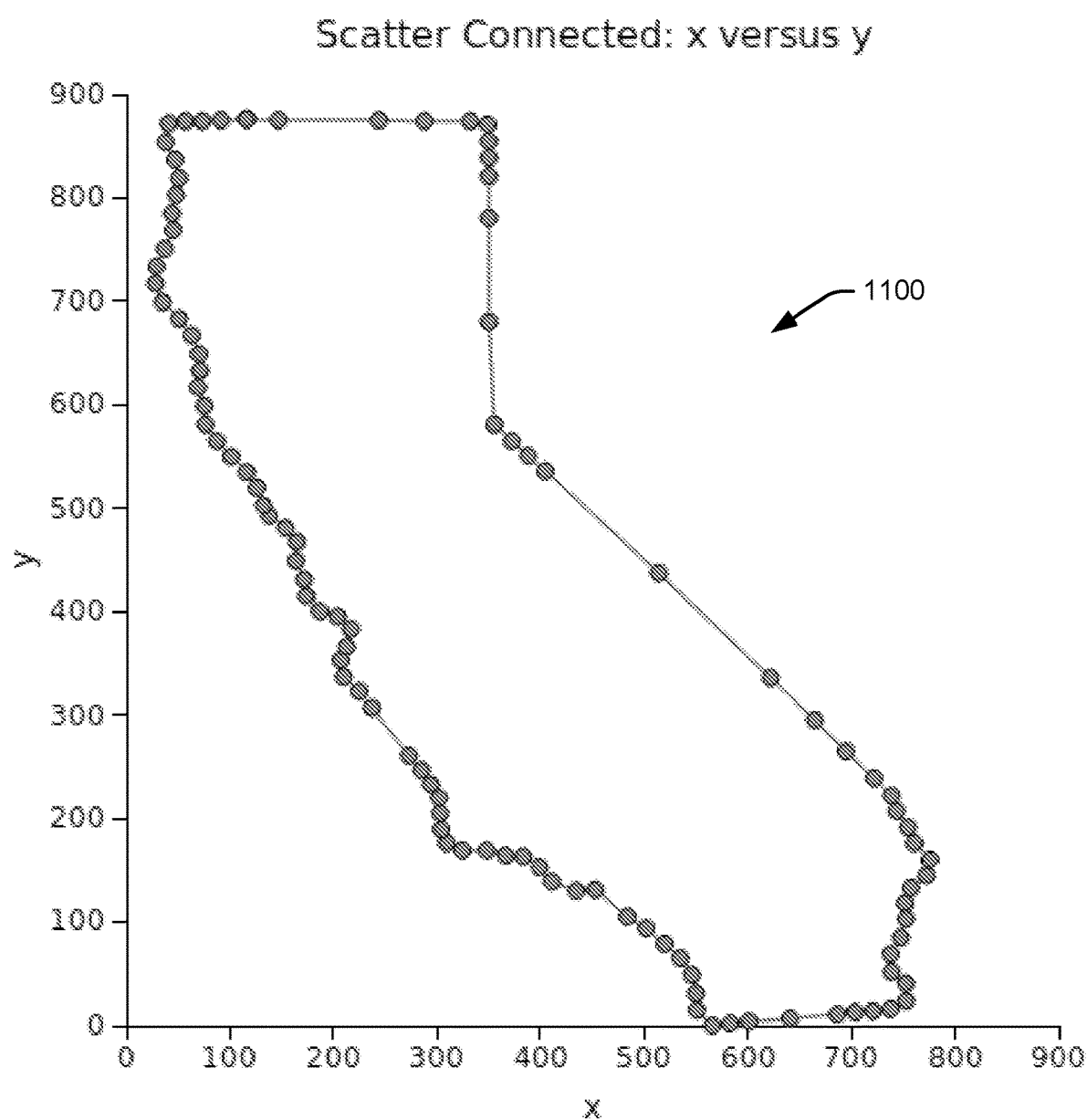
FIG. 11 shows an enclosed shape connected from the adaptively sampled points of FIG. 10.

Given the area with respect to itself, this area can be used as a weight for sampling the points along the perimeter. Qualitatively speaking, so as to provide a resampled edge contour of maximum fidelity to the original edge contour, it is useful to sample points more densely nears corners and turns and less densely for flat portions of the edge contour. This functionality corresponds to that provided by adaptive resampler 20 of FIG. 1 or nonlinear monotonic adaptive sample density chooser 124 of FIG. 2. FIG. 10 shows a scatter plot 1000 of adaptive sampling points resulting from an inverse logarithmic weighting of the form $D=C-B \ln A$, where D is the adaptive sample step size A is the computed area of the edge path with respect to itself at the given point, non-flat sampling constant B=18, and flat sampling constant C=100. As discussed previously, non-linear monotonic functions other than the natural logarithm, and constants B and C of other values, can also be used. FIG. 11 shows the results of the adaptive sampling as a closed polygon 1100, i.e., with line segments connecting the adaptively sampled points shown in plot 1000, corresponding to the functioning of point connector 22 in FIG. 1 or 126 in FIG. 2.

Figures 12, 13:
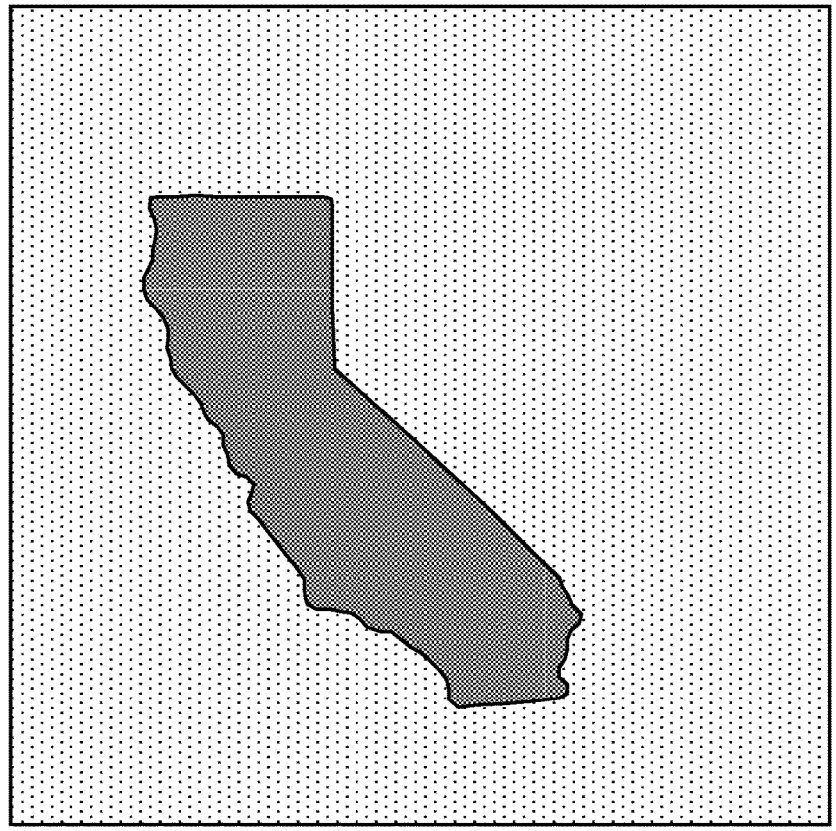
FIG. 12 shows a rendered shape generated from an scalable vector graphics (SVG) file provided from the shape of FIG. 11.
FIG. 13 is a listing of the SVG file used to generate the rendering of FIG. 12.

An adaptively sampled perimeter can be encoded into a vector format. FIG. 12 shows a rendering of the perimeter when encoded as a compact scalable vector graphics (SVG) file, and the listing in FIG. 13 shows the contents of the SVG file that results in the rendering shown in FIG. 12. Other vector formats, such as portable document format (PDF), can also be generated. The generated vector file(s) can in turn can be used to directly drive vector rendering devices, such as 2-D printers, laser cutters, CNC routers, etc. The generated vector file(s) can also be used to generate compact vector representations, such as individual portable network graphics (PNG) slices in a voxel format.

Figure 14:
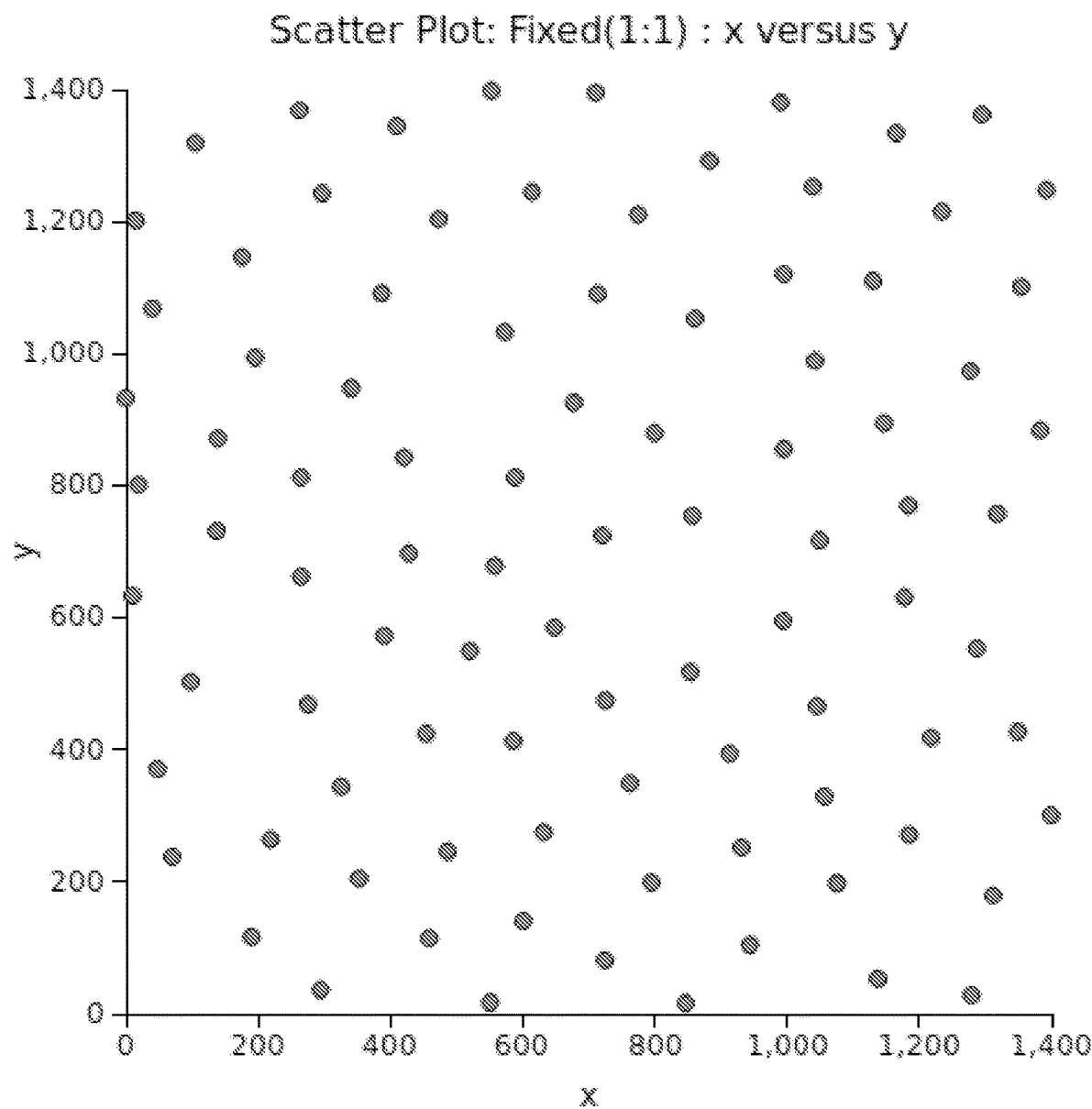
FIG. 14 is a scatter plot of points generated by the Poisson disk method.
Figure 15:
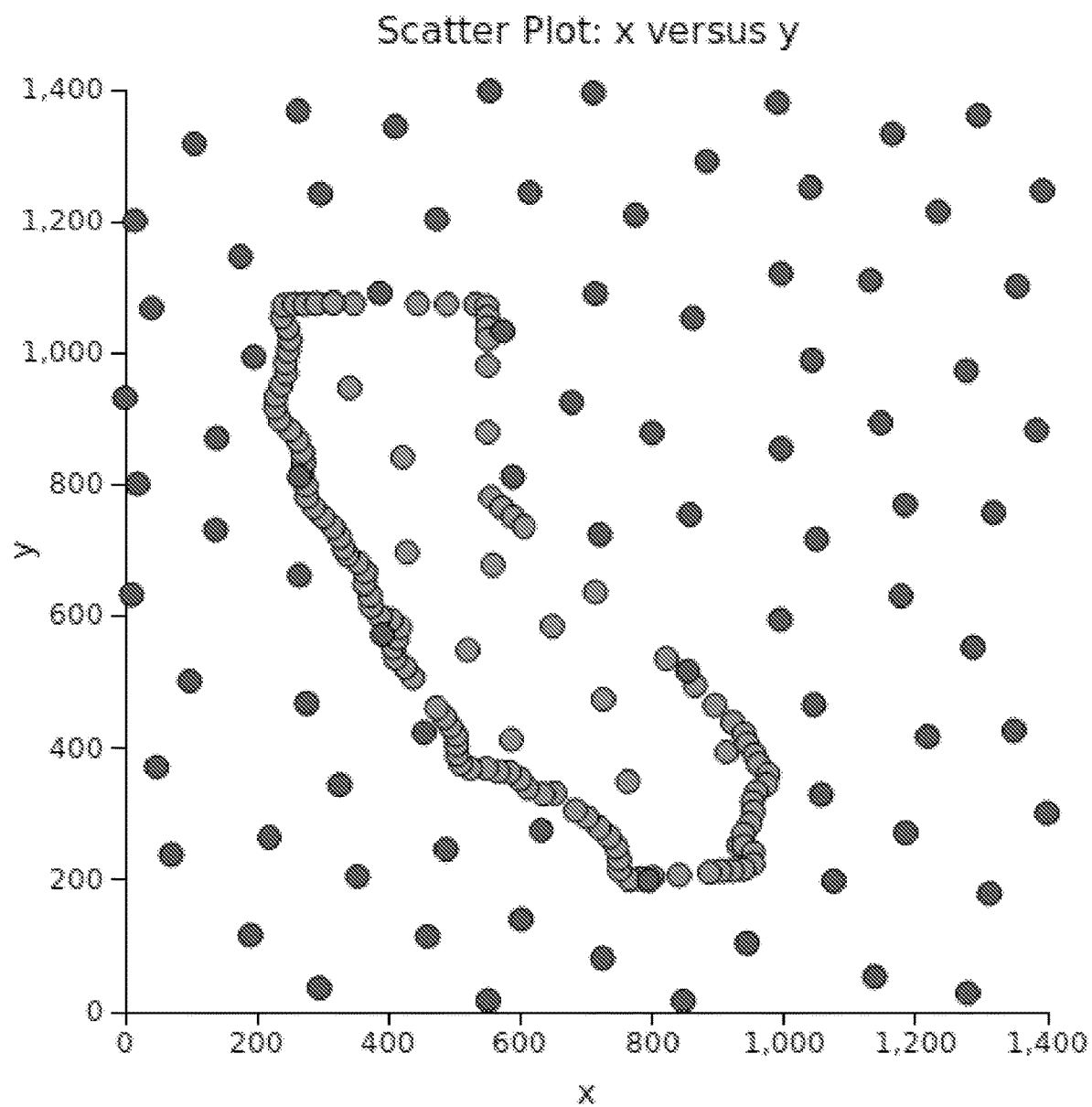
FIG. 15 is the scatter plot of FIG. 14 overlain with the adaptively sampled points of FIG. 10.
Figure 16:
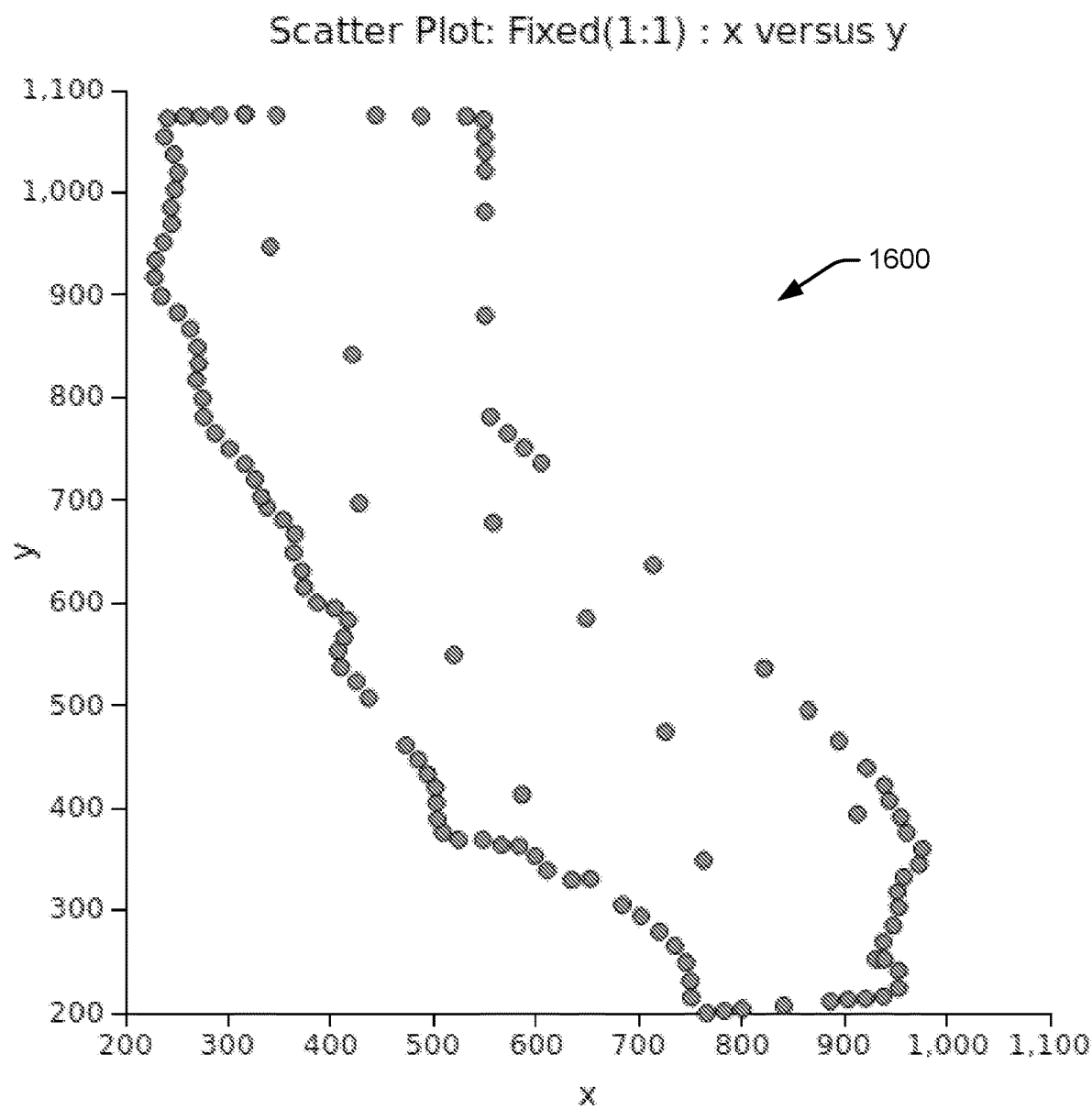
FIG. 16 shows the only those scatter plot of points of FIG. 14 enclosed by the adaptively sampled points of FIG. 10.

As discussed above with regard to additional 2-D data adder 114 of FIG. 2, given an adaptively sampled perimeter, interior points can be included. It is more compact to sample the interior points at an even less dense level than the perimeter. This can be done, for example, using Poisson disc sampling in two dimensions. FIGS. 14 through 16 illustrate such sampling. FIG. 14 shows a field of points generated according to an irregular Poisson disc 2-D sampling. FIG. 15 shows such points as well as the adaptively sampled points forming the shape of the State of California. The plot 1600 of FIG. 16 is like the plot of FIG. 15, but showing only those Poisson disc sampled points falling or on or within the perimeter of the shape. The sampling shown on in FIG. 16 is a highly compact yet highly representative encoding of the original binary input.

Figure 17:
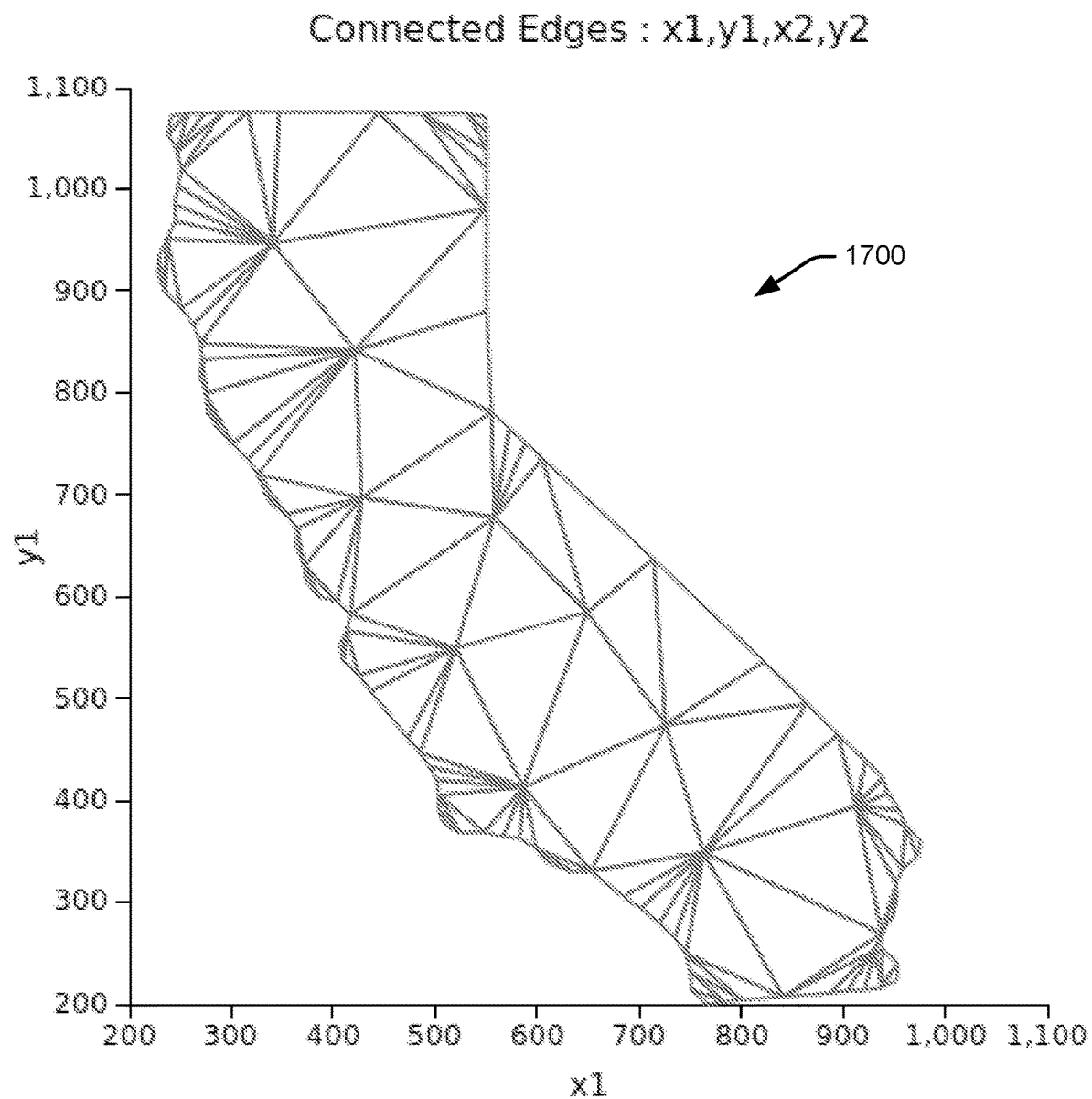
FIG. 17 shows a triangular mesh of connected edges generated from the combined points shown in FIG. 16.

The point sampling can also be tessellated, for example using the Boost polygon library Voronoi diagram function. The resulting Delaunay triangulation 1700 is shown in FIG. 17, producing a 2-D mesh of triangles efficiently representing the original shape in a form that can be read and understood by a number of 3-D systems, such as many printer and fabricator devices, that expect triangular meshes as their inputs.

Figure 18:
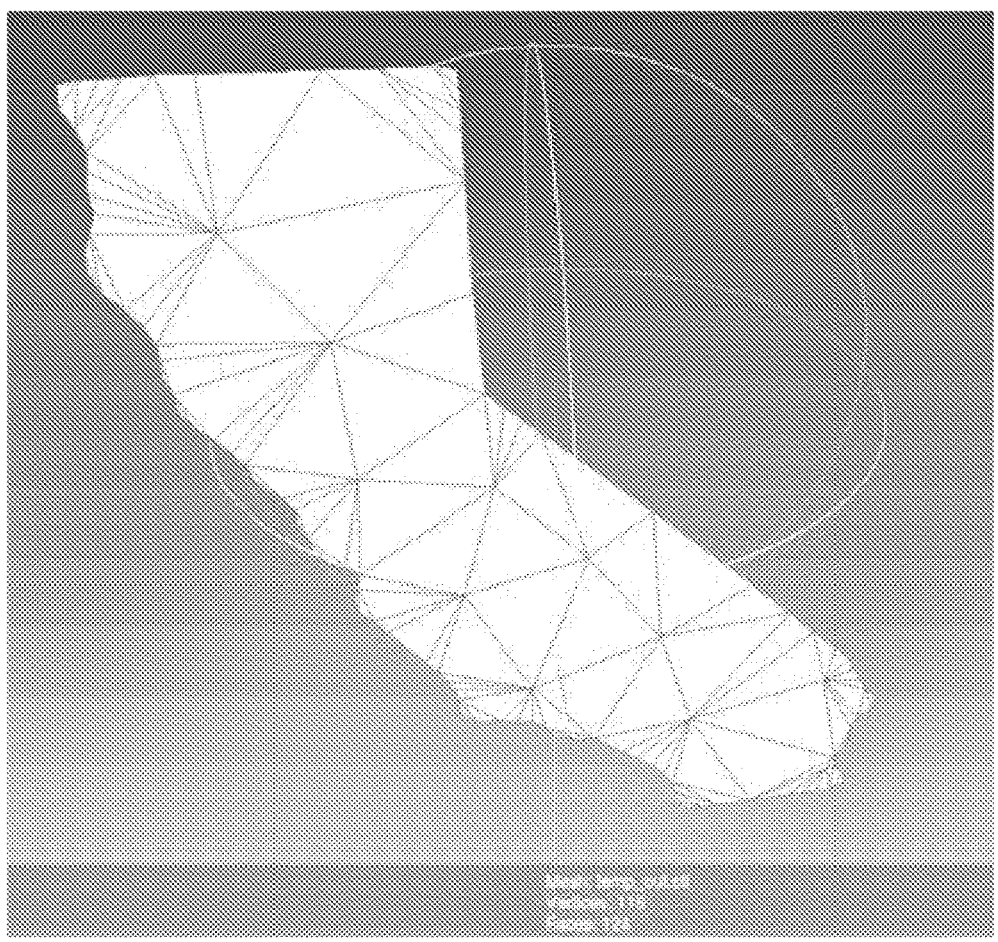
FIGS. 18 and 19 illustrate different perspective views of a three-dimensional solid generated by extruding the mesh of FIG. 17.
Figure 19:
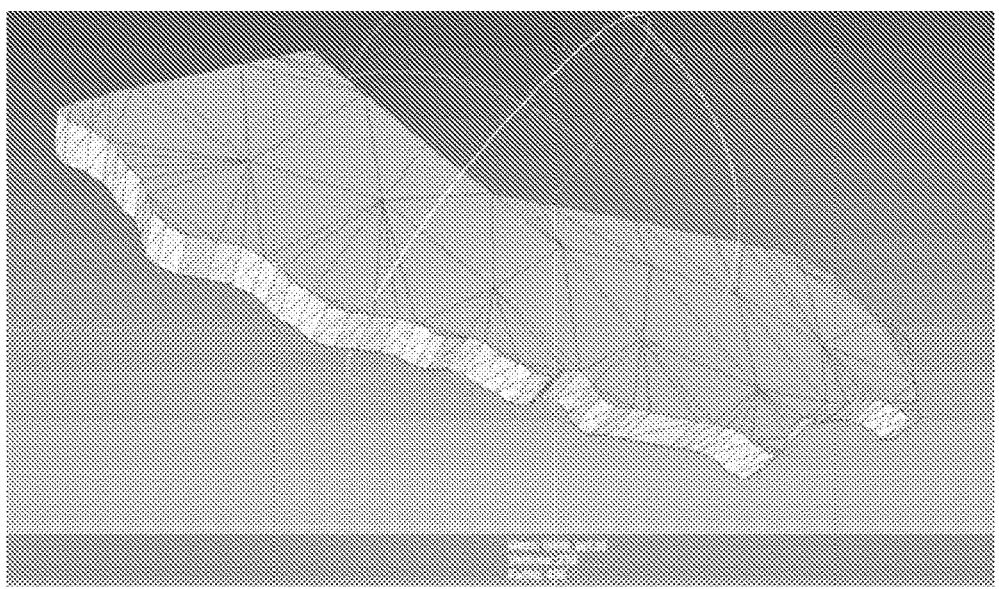
Figure 20:
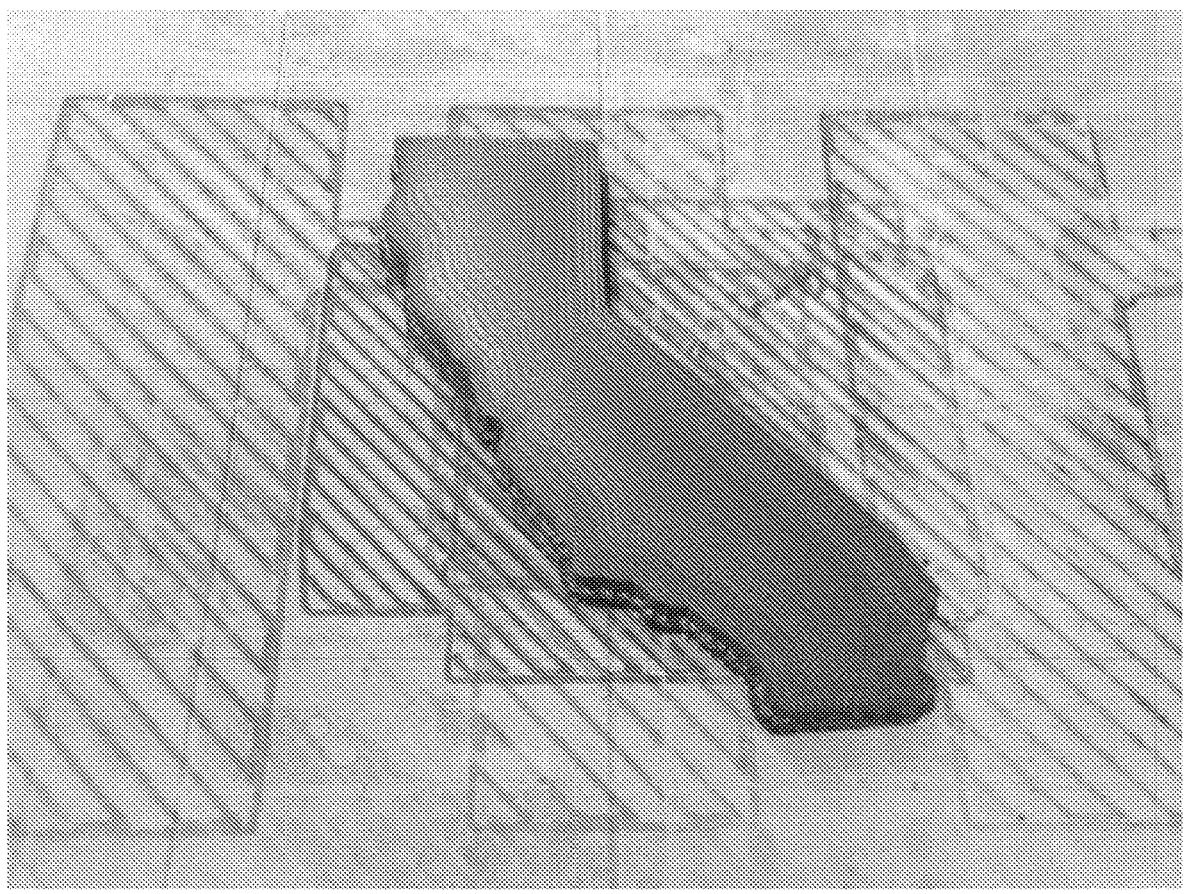
FIG. 20 shows a 3-D printed object created from the solid of FIGS. 18 and 19.

Finally, a triangulated surface can be visualized as a 3-D object, such as in a stereolithography (STL) file format representation. FIGS. 18 and 19 show different perspective views of the California state shape having had its interior filled out with a triangular mesh and with a small amount of depth added to create a solid 3-D object. With a minimal extrusion process, the solid 3-D object can be printed. FIG.

20 shows an FDM print of the object. The file from which the printed object of FIG. 20 was generated consists of a mere 230 vertices.

Figure 21:
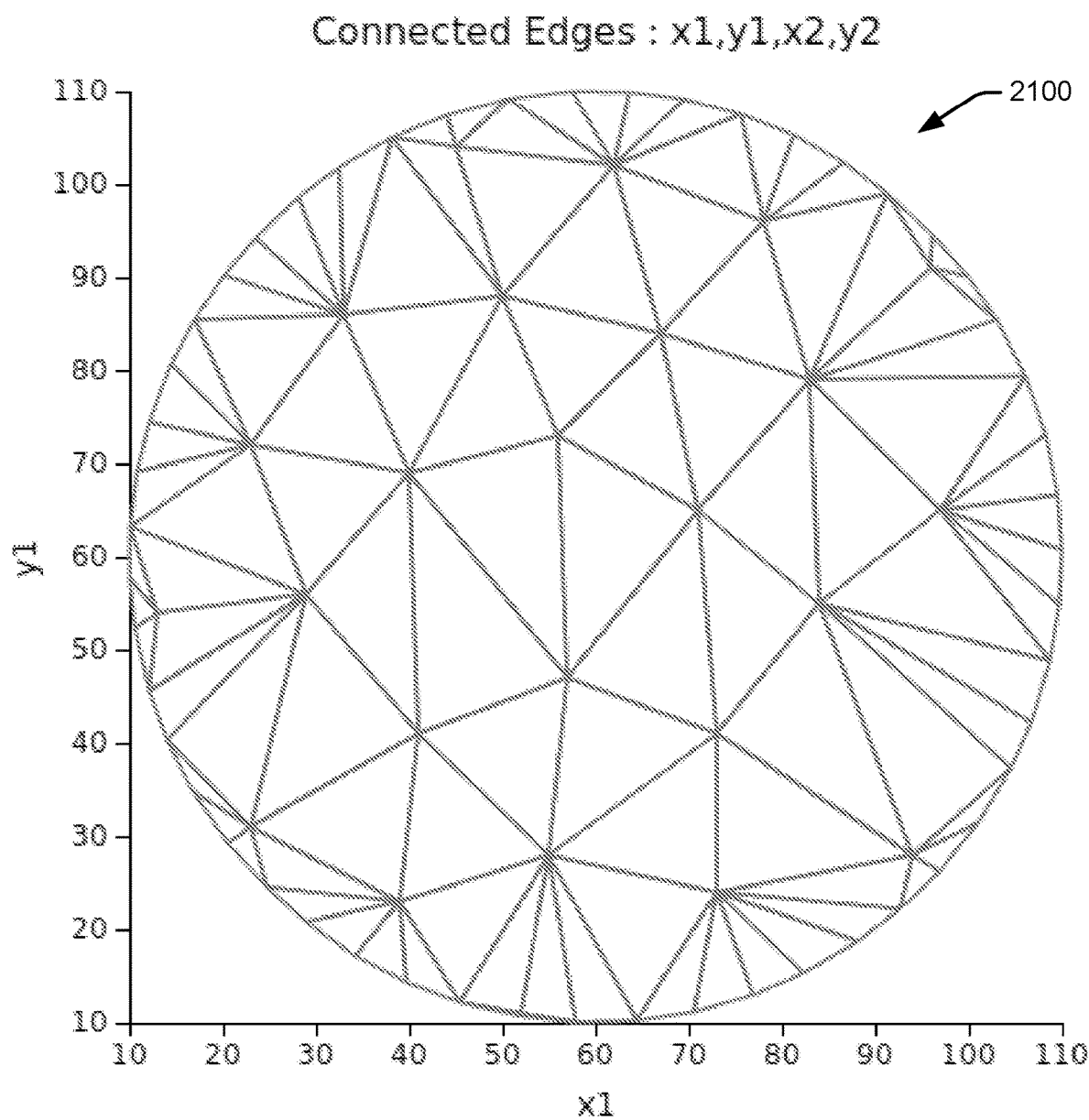
FIG. 21 shows a triangular mesh for an adaptively sampled, Poisson disk filled 2-D circle originated from a mathematical function.

The adaptive point sampling described herein can also be applied to sample mathematical functions, such as the equation for a circle, to generate arbitrary shapes and textures of efficient 2-D and 3-D representation encoding. The result shows a comparable higher density sampling of non-flat regions and a lower sampling for interior points. FIG. 21 illustrates an example of adaptive point sampling as applied to a circle. The generated circle 2100 can be extruded to generated a cylinder, which can be duplicated as arrays of raised dots and printed to generate printed Braille. Other repetitive textures, such as scales of fish and reptiles, can be generated from mathematical functions in similar fashion. Thus, in addition to providing the ability to efficiently generate printable textures from height map scans, the present systems and methods can enable printable textures without any scanned source data, using only mathematical functions as the inputs.

Particularly when used to convert raster pixel or voxel representations to vector polyline or mesh representations, adaptive point sampling can achieve a kind of data compression by eliminating point redundancy along straighter parts of a polyline curve, which can, in turn, result in lower data density curves and/or meshes. The resultant reduced redundancy and lower point density achieves efficiency improvements by requiring less memory to store representations of two- and three-dimensional shapes or objects and by requiring fewer processing resources (e.g., fewer computer processor cycles) in the generation, manipulation, rendering, and/or printing or fabrication of such shapes or objects. As noted, this adaptive point sampling has applications in efficient representations of textures and in 3-D printing.

Figure 22:
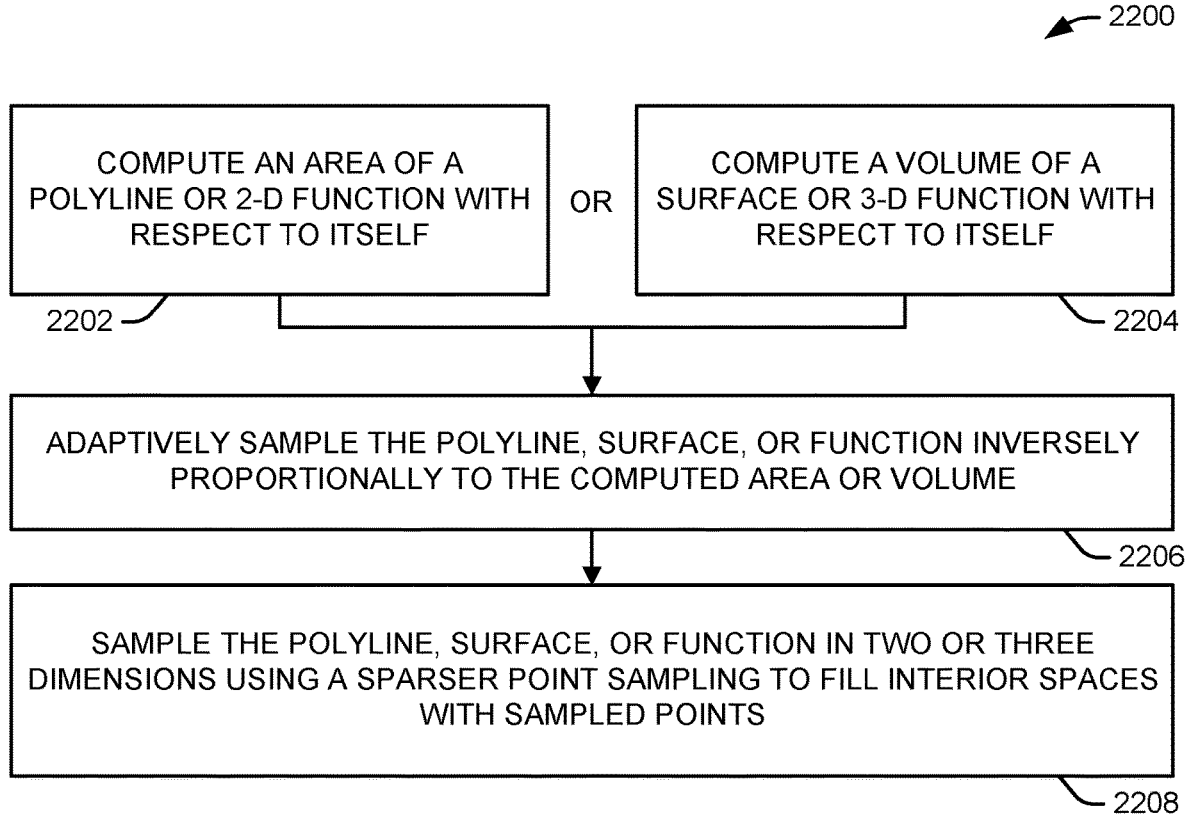
FIG. 22 is a flow chart illustrating an example method of adaptive point sampling.

The flow chart of FIG. 22 illustrates an example method 2200 of adaptive point sampling. The method 2200 can consist of computing 2202 an area of a polyline or 2-D function with respect to itself, or computing 2204 a volume of a surface or 3-D function with respect to itself. As already described in this disclosure, this can be done a number of ways, for example, in the polyline or 2-D functions cases, by computing areas of triangles formed between given points and leading or lagging points for each of a set of given points. For surfaces or 3-D functions, a similar computation can be made using, e.g., volumes of spheres or other 3-D primitives defined similarly. Then, the (comparatively densely sampled) polyline, surface, or function can be adaptively sampled 2206 inversely proportionally to the computed area or volume. In such sampling, flat portions of the polyline's curve (or surface's volume) are thus sampled more sparsely than concavities or convexities. This first polyline, surface, or function sampling can be further sampled 2208 in two or three dimensions using a sparser point sampling, such as a Poisson disc or sphere sampling, to fill interior spaces with sampled points. In the case that the method 2200 starts with a two- or three-dimensional mathematical function rather than a two- or three-dimensional polyline or surface, such as the equation for a circle, triangle, star, sphere, or other geometric primitive, instead of sampling a discrete polyline, a perimeter or continuous path can be sampled.

As discussed herein, adaptive point sampling method 2200 has applications to three- and two-dimensional printing and/or processing. For example, two- or three-dimensional meshes used to describe physical shapes or objects to be printed or fabricated using such printing/or processing can be generated using the above method, based on an a photographed or scanned raster input consisting of pixels or voxels, or starting solely from a parametric description of abstract-function and/or geometric-primitive inputs to be printed or fabricated.

Figure 23:
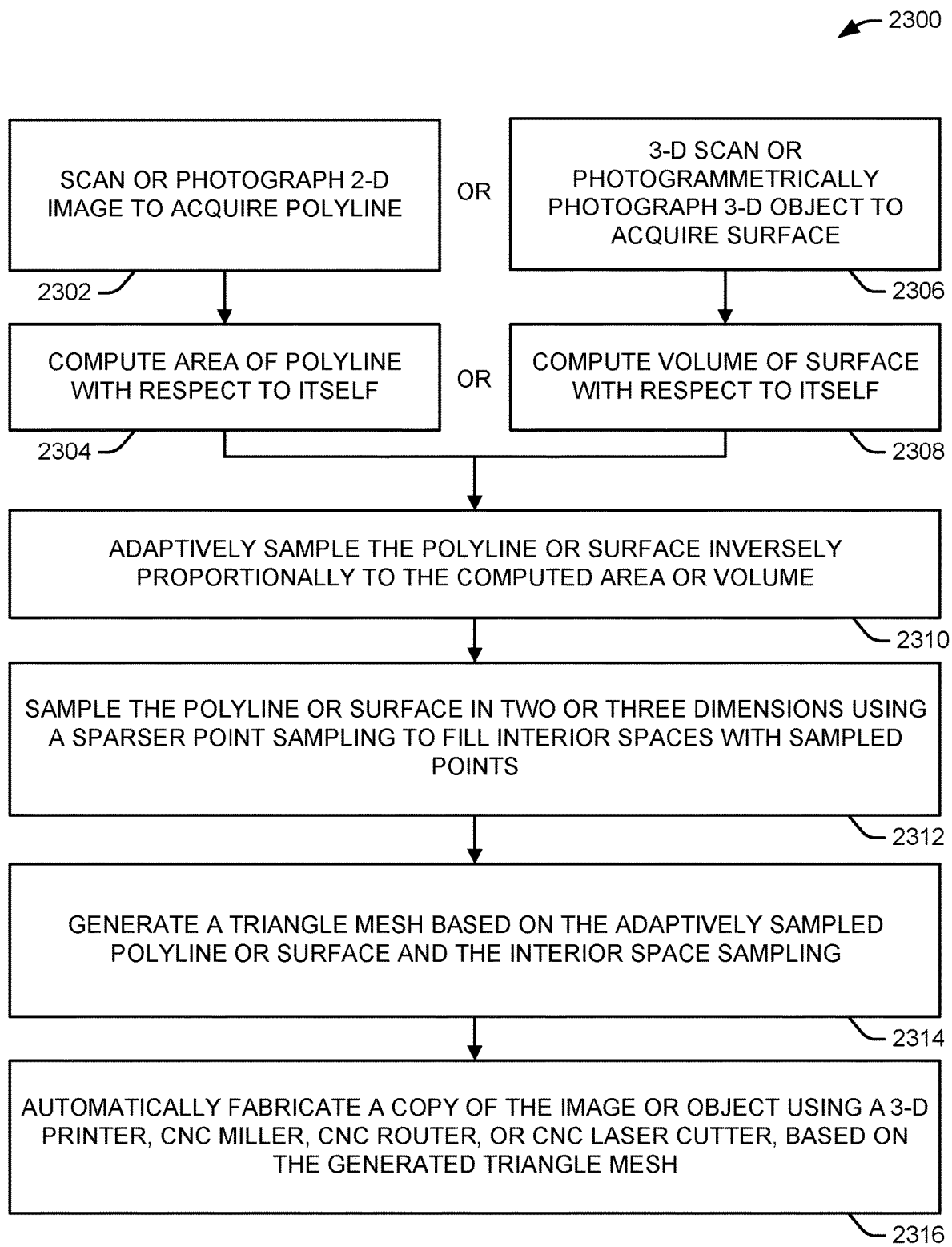
FIG. 23 is a flow chart illustrating an example method of adaptive point sampling.

FIG. 23 illustrates another example method 2300 of adaptive point sampling, similar to method 2200, but with acquiring the 2-D image by scanning or photography 2302 or acquiring the 3-D object using 3-D scanning or photogrammetric photography 2306 serving as the source of the polyline or surface, respectively. As used herein, the term "photogrammetric photography" means taking 2-D photographs of a 3-D object from a number of angles sufficient to recover the positions of the 3-D object's 3-D surface points using photogrammetric methods such that the object could be represented in a computer and physically reproduced based on such representation. The area of the polyline 2304 or volume of the surface 2308 can be computed with respect to itself, the polyline or surface can be adaptively sampled 2310 inversely proportionally to the computed area or volume, and the polyline or surface can be sampled 2312 in two or three dimensions using a sparser point sampling to fill interior spaces with sampled points. A triangle mesh can then be generated 2314 based on (e.g., generated from) the adaptively sampled polyline or surface and the interior space sampling. Then, a copy of the original image or object can be automatically fabricated 2316 using a 3-D printer, a CNC miller, a CNC router, or CNC laser cutter, based on the generated triangle mesh.

The systems and methods herein provide a solution to a technological problem and improve the functioning of computer systems by making graphical manipulations more efficient. Approximating densely sampled polylines or functions in two or three dimensions generally should involve sampling regions of greater change more frequently while not over-sampling regions of minimal change. The adaptive point sampling systems and methods described herein achieve such approximations with an adaptive area of the polyline or function with respect to itself (in two dimensions) and the volume of the surface or function with respect to itself (in three dimensions). The systems and methods are efficient and can be computed in a single pass. They produce results that compare favorably to the best approximations achievable with prior solutions. For example, because the present area-based processing systems and methods are always bounded to provide finite-number results, they do not exhibit differentiability problems of 2-D Gaussian curvature schemes, and have the desirable property that they can be used to find parts of the paths that are interesting. Successive approximation of a polyline or function followed by the interior surface or volume also allows a further reduction in data density for the final sampling. The metric computed, the area of the polyline or function with respect to itself, also allows the solution of additional problems in subsequent processing steps.

Polyline simplification has been investigated for cartography. However, many of the existing methods of polyline simplification, such as provided by the psimpl generic n-dimensional polyline simplification library, make use of a distance calculation with respect to the polyline. Such simplifications do not make use of the area of the curve with respect to itself and can result in varying differences with respect to the method described. First, corners or flat regions can be undersampled. Second, concavities or convexities can be oversampled. Third, distance metrics do not lend themselves as directly to categorical interpretation, such as segmentation into flat, concave and convex sampling regions. Accordingly, the adaptive point sampling systems and methods described herein represent a significant improvement over distance calculation based polyline simplification.

Triangular mesh reduction methods start with a given high density mesh and attempt to compute lower density meshes that accurately represent the original mesh. One of the more commonly recommended mesh reduction techniques is quadric mesh collapse decimation. This technique varies from the disclosed adaptive point sampling systems and methods in the following ways. First, a very high density mesh must first be generated for the object, in many cases consisting of hundreds of thousands of vertices or points. Second, the mesh reduction techniques do not tend to handle the differences between flat and non-flat regions, and as a result, flat regions are still represented with a high-density quantized mesh. Accordingly, the adaptive point sampling systems and methods described herein represent a significant improvement over mesh processing techniques such as quadric edge collapse decimation.

The described systems and methods for adaptive point sampling are compact and efficient. Given a path over a polyline, function or surface one pass suffices to compute the area of this path with respect to itself. This weight and corresponding sampling can be computed in a single pass. The additional sampling of interior surfaces or regions can also be efficiently computed given this initial sampling of the polyline, function or surface. The result is a set of representative points that can then be further analyzed, processed or printed. Discrete volumetric geometries can result in large volumes of dense data and the proposed method provides an efficient and compact means to sub-sample this data. The metric of the path area with respect to the path also allows subsequent processing based on the categories of flat, concave and convex. Finally, the present systems and methods better enable on-demand textures for 3-D printed parts via efficient representation of surfaces. They permit for the ability to provide texture palettes comparable to color pallets, with efficient representations of textured regions.

The preceding description has been presented to illustrate and describe examples of the principles described. This description is not intended to be exhaustive or to limit these principles to any precise form disclosed. Many modifications and variations are possible in light of the above teaching. What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A computing system for adaptive point generation, comprising:
   storage to store a densely sampled polyline or surface; and
   a processor to:
   compute an area of the polyline with respect to itself based on a plurality of given points along the polyline; or compute a volume of the surface with respect to itself;
   adaptively sample points on the polyline or the surface at a density that is inversely proportional to the computed area or the computed volume, wherein the adaptive sampling comprises, for each given point, choosing a step size according to a nonlinear monotonic function; and
   connect the adaptively sampled points as an adaptively sampled polyline or an adaptively sampled surface.

2. The computing system of claim 1, wherein the computing the area of the polyline with respect to itself comprises, for the plurality of given points along the polyline, calculating an area of a triangle defined by a given point and two other points that are a predetermined distance apart from the given point along the contour.

3. The computing system of claim 2, wherein predetermined distance is between two and ten percent of a path length away from the given point.

4. The computing system of claim 1, wherein the nonlinear monotonic function is of the form $D = C - B \ln A$, where D is the step size, A is the computed area of the polyline with respect to itself at the given point, ln is the natural logarithm, and B and C are constants.

5. The computing system claim 4, wherein B is between about 15 and 23.

6. The computing system of claim 4, wherein C is between about 50 and 150.

7. A method, comprising:
   computing, by a processor, an area of a polyline with respect to itself based on a plurality of given points along the polyline, or, computing a volume of a surface with respect to itself;
   adaptively sampling, by the processor, points on the polyline or the surface at a density that is inversely proportional to the computed area or the computed volume, wherein the adaptive sampling comprises, for each given point, choosing a step size according to a nonlinear monotonic function; and
   connecting, by the processor, the adaptively sampled points as an adaptively sampled polyline or an adaptively sampled surface.

8. The method of claim 7, further comprising:
   sampling the polyline in two dimensions using a Poisson disk sampling, or sampling the surface in three dimensions using a Poisson sphere sampling, to fill interior spaces of the polyline or the surface with sampled points.

9. The method of claim 8, wherein the Poisson disk sampling or the Poisson sphere sampling is sparser than the adaptive sampling.

10. The method of claim 8, further comprising:
    acquiring 2-D pixel data comprising the polyline by scanning or photographing a 2-D image, or acquiring 3-D voxel or height map data composing the surface by 3-D scanning or photogrammetrically photographing a 3-D object.

11. The method of claim 10, further comprising
    generating a triangle mesh based on the adaptively sampled polyline or the adaptively sampled surface; and
    automatically fabricating a copy of an image or an object using a 3-D printer, computer numerical control (CNC) router, CNC millers, or CNC laser cutter based on the generated triangle mesh.

12. The method of claim 7, wherein the computing the area of the polyline with respect to itself comprises, for the plurality of given points along the polyline, calculating an area of a triangle defined by a given point and two other points that are a predetermined distance apart from the given point along the contour.

13. A non-transitory machine-readable medium storing instructions that when executed cause a processor to:
  compute an area of a polyline with respect to itself, or compute a volume of the surface with respect to itself;
  adaptively sample points on the polyline or the surface at a density that is inversely proportional to the computed area or the computed volume, wherein the adaptive sampling comprises, for each given point, choosing a step size according to a nonlinear monotonic function; and
  connect the adaptively sampled points as n adaptively sampled polyline or an adaptively sampled surface.

* * * * *